(12) United States Patent
Nishino et al.

(10) Patent No.: US 6,386,980 B1
(45) Date of Patent: May 14, 2002

(54) GAME APPARATUS, GAME SYSTEM USING SAME, AND INFORMATION PROCESSING UNIT

(75) Inventors: Akira Nishino; Kunihiro Shirahata; Takaharu Terada; Katsuhito Gotoh; Takashi Tsukamoto; Ryutaro Nonaka; Naoya Soma; Katsutoshi Hayashida, all of Tokyo (JP)

(73) Assignee: Kabushiki Kaisha Sega Enterprises, Tokyo (JP)

(*) Notice: Subject to any disclaimer, the term of this patent is extended or adjusted under 35 U.S.C. 154(b) by 0 days.

(21) Appl. No.: 09/472,142

(22) Filed: Dec. 27, 1999

(30) Foreign Application Priority Data

Dec. 26, 1998 (JP) .......................................... 10-376858

(51) Int. Cl.[7] .................................................. A63F 9/22
(52) U.S. Cl. ............................. 463/43; 463/9; 463/40; 463/41; 463/42
(58) Field of Search .................................. 463/40–44, 9

(56) References Cited

U.S. PATENT DOCUMENTS

| | | | | |
|---|---|---|---|---|
| 4,586,707 A | * | 5/1986 | McNeight et al. ............ 273/1 R |
| 5,377,997 A | | 1/1995 | Wilden et al. .............. 273/434 |
| 5,577,185 A | * | 11/1996 | Tunnell et al. ............. 395/173 |
| 5,730,654 A | * | 3/1998 | Brown ........................ 463/1 |
| 5,791,992 A | * | 8/1998 | Crump et al. ............... 463/41 |
| 5,921,864 A | * | 7/1999 | Walker et al. ............... 463/9 |
| 5,984,786 A | | 11/1999 | Ehrman ..................... 463/42 |
| 6,123,619 A | | 9/2000 | Tokita et al. ............... 463/43 |

FOREIGN PATENT DOCUMENTS

| | | |
|---|---|---|
| GB | 2 163 929 A | 3/1986 |
| JP | 8-241429 A2 | 9/1996 |
| WO | WO 00/31613 A | 6/2000 |

* cited by examiner

*Primary Examiner*—Michael O'Neill
*Assistant Examiner*—Carmen D. White
(74) *Attorney, Agent, or Firm*—Finnegan, Henderson, Farabow, Garrett & Dunner, L.L.P.

(57) ABSTRACT

A game apparatus comprises: a macro group, with a scenario described therein, for commanding a procedure to process the scenario; a data group consisting of video data VD, graphics GF, texts TXT, audio data AD and other information used in accordance with the progress of the scenario; and a program for causing a CPU to make a game progress by using the data group on the basis of the command of the macro group. This game apparatus comprises: a first device for externally incorporating a scenario macro of, for example, a puzzle game; and a second device for giving a command to the program by means of the scenario macro SM obtained externally by the first device, and of providing a new scenario by reusing the data group.

26 Claims, 18 Drawing Sheets

GAME APPARATUS, GAME SYSTEM USING SAME, AND INFORMATION PROCESSING UNIT

BACKGROUND OF THE INVENTION

1. Field of the Invention

The present invention relates to a game apparatus and a game system. More particularly, this invention relates to a game apparatus capable of providing new game progress by externally incorporating a scenario macro by using a communication network or a recording medium and reusing existing video data (animation), graphics, texts, and other information, and this invention also relates to a game system capable of providing the game apparatus with the scenario macro.

Moreover, this invention relates to an invention wherein the above-described system is applied to an information processor and an information processing system. Namely, the game system of this invention can be applied to a programming system for the information processor.

2. Description of Related Art

Examples of conventional game apparatus of the above-described type include: those capable of providing various kinds of game progress by switching compact disks (CDs): and those capable of providing game progress by using so-called additional scenarios which have the same basic system, and the scenarios of which are remade, or those capable of providing game progress on personal computers (PCs) or the like by using additional scenarios on floppy disks (FDs) or CDs.

The former game apparatus described above has a problem in that the labor required for development of a game or the labor for sales activities are almost the same as that required for the creation of a new game.

The latter game apparatus has a problem in that since a separate game progress is prepared beforehand, if the entire game progress is disclosed, no further scenario changes can be made.

SUMMARY OF THE INVENTION

It is an object of this invention to provide a game apparatus which can solve the above-described problems, provide semi-infinite new scenario progress, and reduce the labor for the development and sale thereof, and to provide a game system using such a game apparatus.

A game apparatus of this invention which solves the above-described problems comprises:

means for storing a macro group with a game scenario described therein for commanding the processing procedures of the scenario;

means for storing a data group consisting of video data, graphics, texts and other information used in accordance with the progress of the game scenario; and means for storing a program to cause processing means to make a game progress by using the data group on the basis of the command of the macro group, and the game apparatus further comprises:

first means for externally incorporating a scenario macro; and second means for giving a command to the program on the basis of the scenario macro obtained externally by the first means and for providing a game of a new scenario by reusing the data group.

Such a game apparatus uses the first means to externally incorporate a new scenario macro, and then uses the second means to give a command to the program by means of the new scenario macro and reuse the data group existing inside of the game apparatus, thereby making a new game progress.

In the game apparatus, the first means is the means for externally incorporating the scenario macro and the like by using a communication network or a recording medium. The recording device inside of a portable game apparatus shall be included in the recording medium.

Moreover, in the game apparatus described above, the second means comprises: a program code for interpreting the macro group or the scenario macro; and a program code for conducting processing in accordance with an abstracted action command.

Furthermore, in the game apparatus, the scenario macro is binary data in which procedures for processing the scenario are listed.

When the above-described game apparatus is applied to an actual game application, features of such a structure can be listed as follows.

For example, the scenario macro is macro data for controlling the progress of the scenario of a puzzle game application. In this case, the puzzle game nay be a game which requires a player to operate objects moving in images on a monitor screen in accordance with questions. The scenario macro is preferably composed of information about initial positions of the objects, information to display the objects next time, information to clear the game, and information about a character to appear in the game. In this case, it is desirable that the second means comprise means for automatically preparing a text of the questions by using the clear conditions and the character conditions. Moreover, the second means may comprise inflection means for changing the ending of the question text according to the type of the character. Furthermore, the objects may be display objects copying jewels caused to fall down from the top of an image on the monitor screen.

On the other hand, in order to attain the above-described object, a game system of this invention comprises:

a game apparatus which comprises:
  means for storing a macro group with a game scenario described therein for commanding the processing procedures of the scenario, a data group consisting of video data, graphics, texts and other information used in accordance with the progress of the game scenario, and a program to cause processing means to make a game progress by using the data group on the basis of the command of the macro group;
  first means for externally incorporating a scenario macro; and
  second means for giving a command to the program by means of the scenario macro obtained externally by the first means and for providing a new scenario by reusing the data group; and
distribution means of distributing the scenario macro to the game apparatus.

Such a game system can easily distribute the scenario macro to a target game apparatus through the distribution means.

In the above-described system, the first means is the means for externally incorporating the scenario macro and the like by using a communication network or a recording medium.

Moreover, in the above-described system, the second means comprises: a program code for interpreting the macro group or the scenario macro; and a program code for conducting processing in accordance with an abstracted action command.

In the system, the scenario macro is binary data in which procedures for processing the scenario are listed.

In the system, the distribution means distributes a new scenario macro every given period of time.

In the system, the distribution means supplies the scenario macro to a communication network or a recording medium.

Also with such a game system, it is possible to add a characteristic structure which is similar to that of the above-described game apparatus as applied to an actual game application.

Moreover, this invention is a recording medium with a program stored thereon for causing a computer to function as the processing unit and the game apparatus stated in the descriptions of any one of the game apparatus and the game system.

This recording medium includes, for example, floppy disks, hard disks, magnetic tapes, optical magnetic disks, CD-ROMs, DVDs, ROM cartridges, RAM memory cartridges with battery backup, flash memory cartridges, and nonvolatile RAM cards.

Communication media such as wire communication media like telephone lines, and radio communication media like microwave lines are included. The Internet is also included in the communication media herein referred to.

A recording medium is the medium with information (mainly digital data and programs) recorded thereon by some physical means and is capable of causing a processing unit such as a computer or a dedicated processor to perform specified functions. Namely, such a recording medium may be any medium which can download, by whatever means, programs onto a computer and cause the computer to perform specified functions.

Concerning the information processor of this invention, for example, macro data is stored in a server or a portable recording medium, and macro data reading means reads macro data through access to the server or directly from the portable recording medium.

Accordingly, if the information processor has program codes to specify the details of information processing, it can make its control means perform various processing steps by externally incorporating macro data for determining the progress of processing. Moreover, the macro data is composed only of plural macro commands for specifying the program codes and for specifying readout procedures and does not contain any program code which may cause an increase in the data amount. Therefore, the data amount can be as small as possible and such an information processor is most suitable for the supply of external scenario data.

When this information processor is used as a game apparatus, it is possible to treat the scenario macro for determining the progress of a game as the macro data and to externally incorporate various scenarios, thereby realizing various game progress.

DESCRIPTION OF THE PREFERRED EMBODIMENTS

An embodiment of this invention is hereinafter explained with reference to the attached drawings. In the following descriptions, a program or a program code conducts substantial processing in a series of processing procedures, for example, the processing to specify at what position and at what time which character or sound should be output in the progress of video data. A macro, macro data or a macro group is for making a program code operate as described in the following example. If a macro command is, for example, A1 (2,9,5), A represents a program code necessary for the display, 1 represents video data and, when the video data corresponds to what a character is developed in a virtual space, (2,9,5) represent the location (coordinates) at which the character is specified. A group of macro commands is macro data. If the macro data is for controlling the progress of the scenario of a game application, it is called a scenario macro.

(First Embodiment)

A first embodiment of this invention is hereinafter described with reference to FIGS. 1 through 6.

Figure 1:
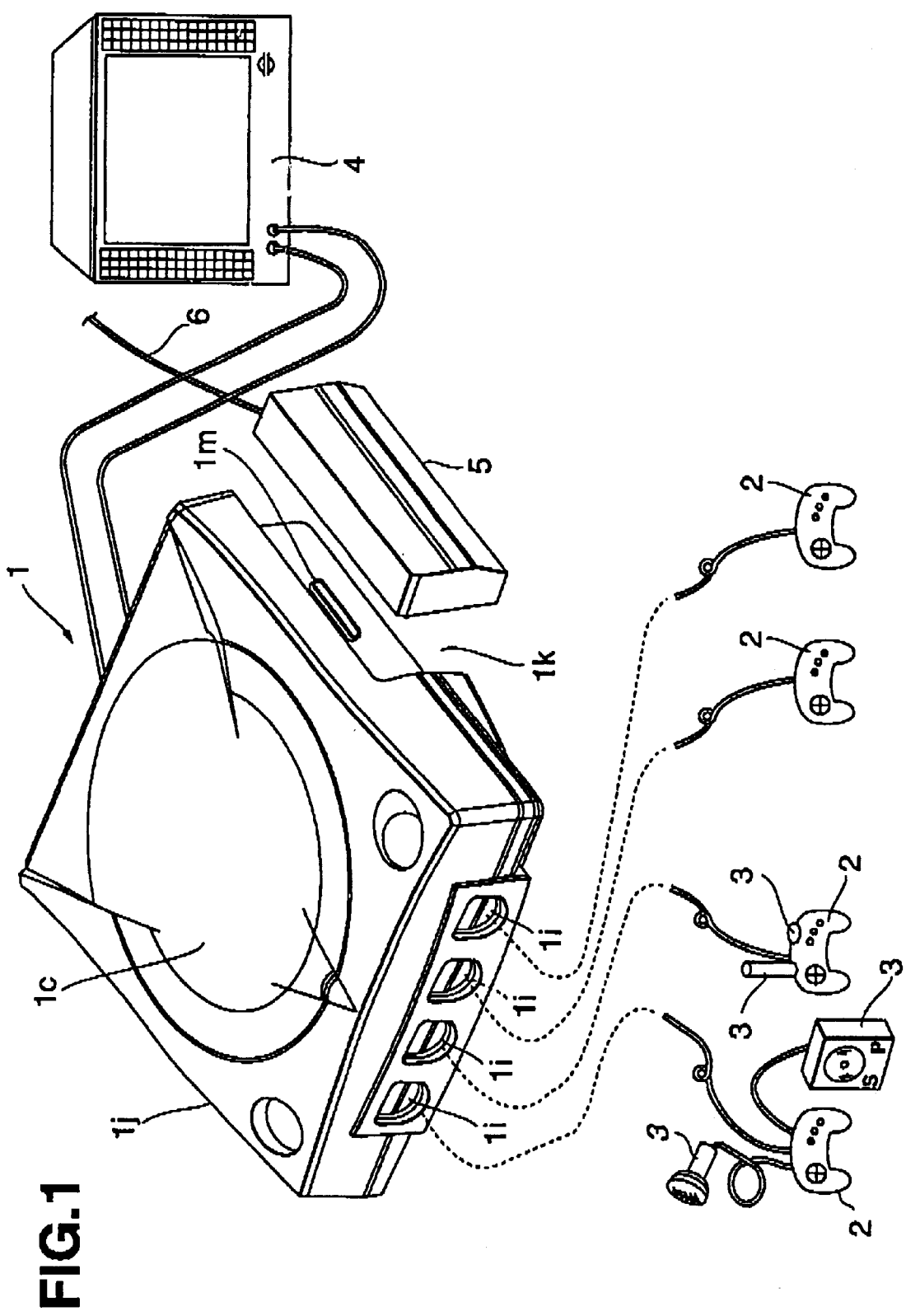
FIG. 1 is a perspective view of an example of a game apparatus according to an embodiment of this invention.
Figure 3:
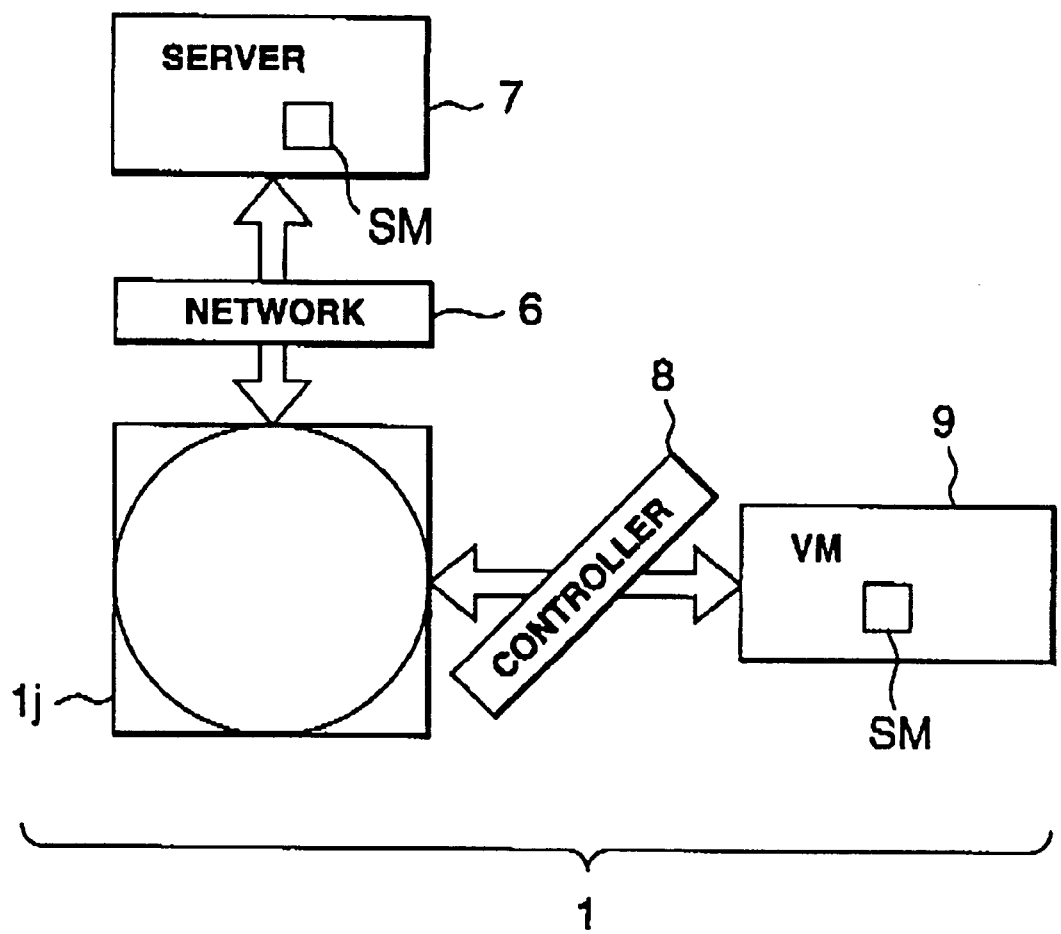
FIG. 3 is a block diagram which shows a game system according to an embodiment of this invention.

FIG. 1 is a perspective view of an example game apparatus according to a first embodiment of this invention. In this drawing, reference numeral 1 indicates a game apparatus, This game apparatus 1 is composed by providing a control system of the game apparatus inside of a housing 1$j$ formed with, for example, plastic or other materials in a substantially rectangular parallelepiped shape. This game apparatus 1 has a concave 1$k$ formed therein at a part of the housing 1$j$. An extension connector 1$m$ is provided at a given position of the concave 1$k$ of the housing 1$j$. As shown in FIG. 1, for example, a modem 5 is mounted in a freely attachable and detachable manner at this extension connector 1$m$. Needless to say, the extension connector 1$m$ is designed to be capable of receiving, besides the modem 5, a receptacle of a parallel-type attachment described later or a receptacle of a cable to connect such an attachment. On the front side of the housing 1$j$ of the game apparatus 1 peripheral connectors 1$i$, 1$i$, 1$i$ and 1$i$ are provided. Basic devices (peripheral devices) 2 and extension devices (additional peripheral devices) 3 are connected to these connectors 1$i$. As described later, a controller 8 is made to operate as the basic device 2, while a memory card 9 is made to operate as the extension device 3 (ref. FIG. 3). Moreover, a CD-ROM device 1$c$ is provided on the top of the housing 1$j$ of the game apparatus 1.

Figure 2:
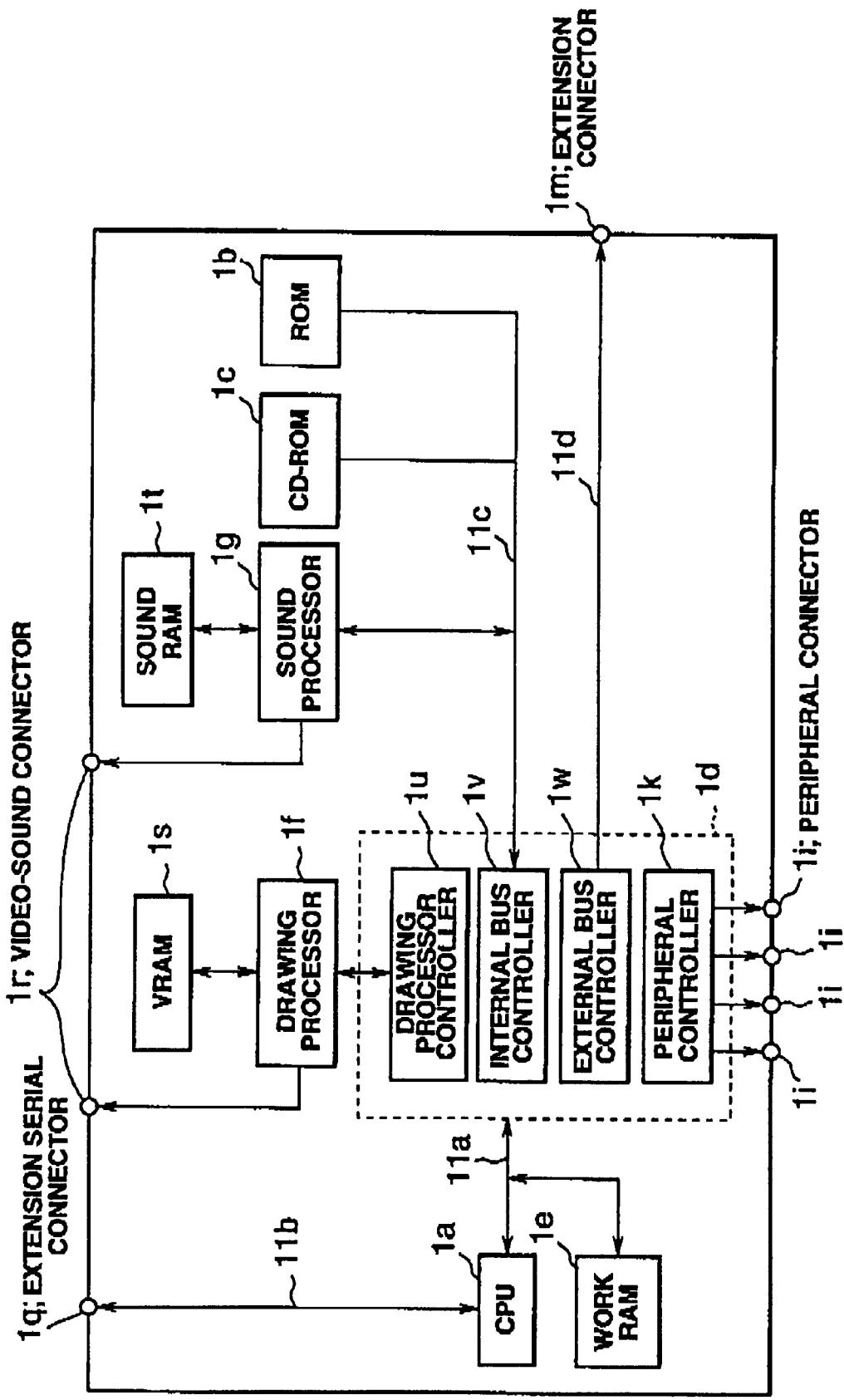
FIG. 2 is a block diagram which shows a control system of the game apparatus of FIG. 1.

On the back of the housing of the game apparatus 1, a power source connector, an extension serial connector and an audio-video connector are respectively located. At this power source connector, a plug of a power source cable for the game apparatus can be connected. The extension serial connector 1$q$ (ref. FIG. 2) is designed to be capable of receiving a receptacle of a serial-type attachment described later or a receptacle of a cable connected to such an attachment. A monitor 4 is connected through a cable to the audio-video connector. On the back of the modem 5, a telephone line connector is provided, to which a network 6 such as a telephone line or a communication network is connected.

FIG. 2 is a block diagram illustrative of a control system of the game apparatus. Concerning FIG. 2, an explanation is given by using the same reference numerals to the same components as shown in FIG. 1. This game apparatus 1 is composed of: a CPU 1$a$ as a processing unit for executing game programs and other control programs; a ROM 1$b$ for storing program codes which interpret the macro group or the scenario macro as control programs for the game apparatus, program codes which conduct processing in accordance with abstracted action commands, and other data or operating systems required for the processing of the game programs; a CD-ROM device 1$c$ for reading the data and programs from a CD-ROM which stores a macro group with a given scenario described therein and for commanding the processing procedures of the scenario, a data group consisting of video data, graphics, texts and other information used in accordance with the scenario, and programs to cause the processing unit to make a game progress by using the data group and in accordance with commands of the macro group; a bus controller 1$d$ for controlling data transfer between the CPU 1$a$ and the respective parts; a RAM 1$e$ used for retaining programs of the CPU 1$a$ and for data processing; a drawing processor 1$f$ or forming picture signals from drawing data; and a sound processor 1$g$ for forming sound signals from sound data.

The drawing processor 1$f$ is connected to a VRAM 1$s$ which is used at the time of formation of picture signals. The sound processor 1$g$ is connected to a sound RAM 1$t$ which is used at the time of formation of sound signals. An output port of the drawing processor 1$f$ and an output port of the sound processor 1$g$ are connected to the audio-video connector 1$r$.

The above-mentioned bus controller 1$d$ is mainly composed of a peripheral interface 1$h$, a drawing processor controller 1$u$, an internal bus controller 1$v$, and an external bus controller 1$w$.

The bus controller 1$d$ is connected through a bus 11$a$ to the above-described CPU 1$a$, and the CPU 1$a$ can also control the bus controller 1$d$. The RAM 1$e$ is also connected to this bus 11$a$. Moreover, the extension serial connector 1$r$ is directly connected through a bus 11$b$ to the CPU 1$a$, and this CPU 1$a$ exchanges signals by a data transfer method with a serial-type attachment connected to the extension serial connector 1$r$; the CPU 1$a$ can thereby control and use the attachment. Namely, this game apparatus 1 is designed in a manner such that the serial-type attachment can be connected thereto and signals such as programs, images, sounds and commands can be exchanged between the attachment and the game apparatus, and it is also possible, for example, to incorporate the scenario macro of this invention.

The drawing processor controller 1$u$ of the bus controller 1$d$ can control the drawing processor 1$f$ under the control of the CPU 1$a$. Moreover, the CD-ROM device 1$c$, the ROM 1$b$ and the sound processor 1$g$ are respectively connected through a bus 11$c$ to the internal bus controller 1$v$. This internal bus controller 1$v$ can control the actions of the CD-ROM device 1$c$, the ROM 1$b$ and the sound processors 1$g$ under the control of the CPU 1$a$. Furthermore, an output port of the external bus controller 1$w$ is connected through a bus 11$d$ to the extension connector 1$m$. This external bus controller 1$w$ is designed in a manner such that it exchanges signals with a parallel-type attachment connected to the extension connector 1$m$ under the control of the CPU 1$a$, thereby being capable of controlling and using the attachment. Namely, this game apparatus 1 is designed in a manner such that the parallel-type attachment can be connected thereto and signals such as programs, images, sounds and commands can be exchanged between the attachment and the game apparatus 1, and it is also possible, for example, to incorporate the scenario macro of this invention.

Examples of the serial-type attachment to be connected to the extension serial connector 1$r$ are: PHS, data recording devices, communication cables, or other serial attachments.

Examples of the parallel-type attachment to be connected to the extension connector 1$m$ are: terminal adapters, cable modems (such as, the modem 5 in FIG. 1), satellite data receivers, portable terminal units (PDA), portable telephones, data recording devices, or other parallel attachments.

FIG. 3 is a block diagram illustrative of a game system according to an embodiment of this invention. In the embodiment shown in FIG. 3, the above-described attachment, for example, a communication modem 5, is connected to the extension serial connector 1$r$ or the extension connector 1$m$ of the game apparatus 1, which is connected through a network (communication network) 6 to a server 7, thereby constructing a system capable of receiving the supply of the scenario macro SM from the server 7 to the game apparatus 1.

Moreover; in this embodiment, a memory (which may be called VM or memory card) 9 in a portable game device as a recording medium is connected through a controller 8 to the game apparatus 1, thereby constructing a game system capable of receiving the supply of the scenario macro SM from the VM 9 to the game apparatus 1.

Figure 4:
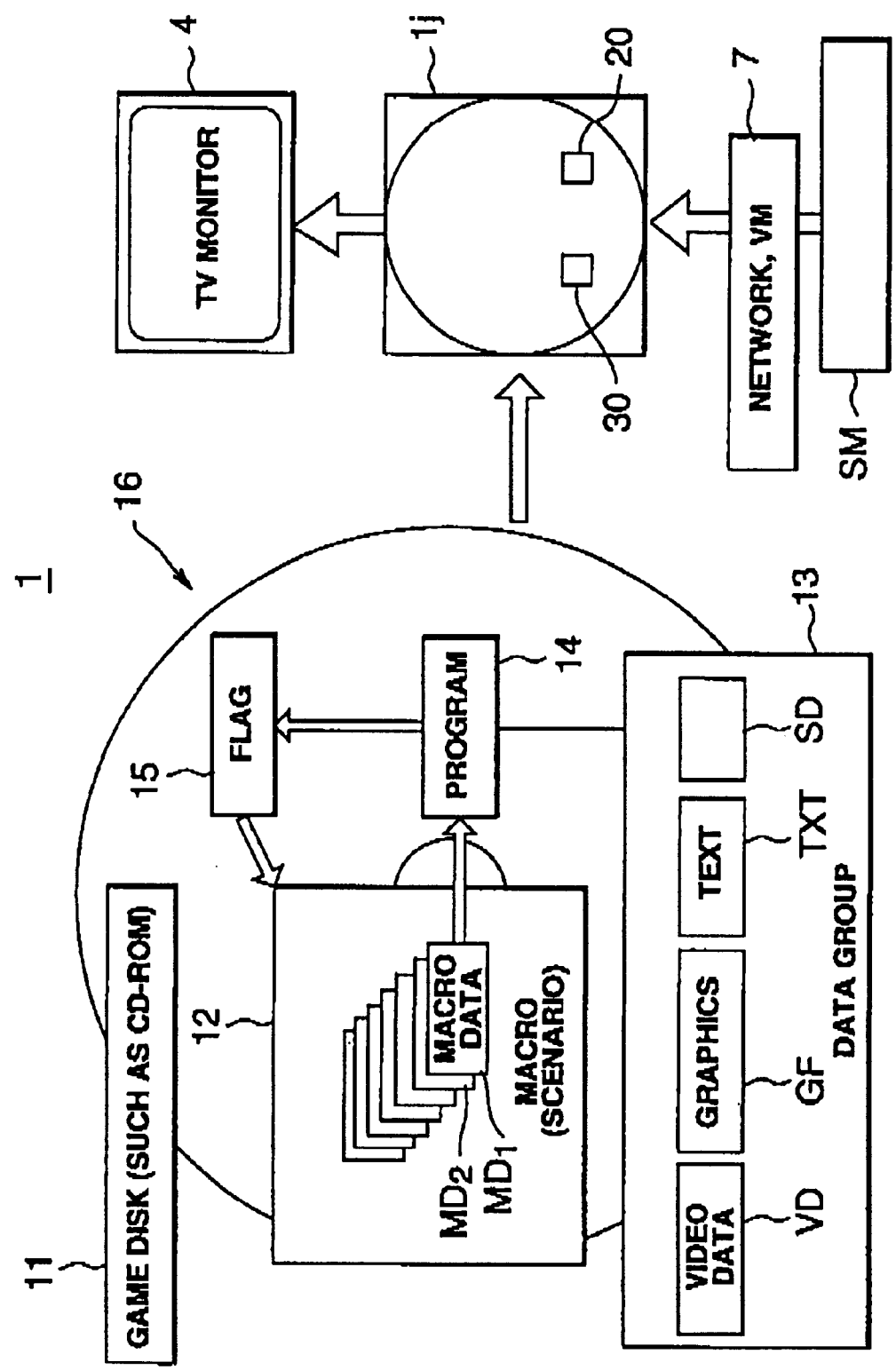
FIG. 4 is a block diagram which shows the outline of the game system of this invention.

FIG. 4 is a block diagram illustrative of the outline of the game system of this invention.

Concerning this embodiment, it is necessary to prepare game software in the structure as shown in FIG. 4. Specifically speaking, game software 16 is to be made in the structure, as shown in FIG. 4, which is composed of: a macro group 12 in which a given scenario is described and a multiplicity of macro data such as MD1 and MD2 for commanding procedures to process the scenario; a data group 13 consisting of video data VD, graphics GF, texts TXT, sound data and other information to be used in accordance with the scenario; a program 14 for causing the CPU 1a to make the game progress by using the data group 13 on the basis of commands from the macro group 12; and a flag 15. The game software 16 of such a structure is stored on, for example, a CD-ROM 11 in order to be provided.

The macro data MD1, MD2, etc. of the macro group 12 respectively include enumerated procedures of the game apparatus as stated above. The game apparatus 1 executes a program code, thereby automatically interpreting the macro data. It then executes the program code in accordance with the macro data and conducts the predetermined procedure processing in order.

The game apparatus 1 can incorporate the entire macro group 12, the data group 13 and the program 14 of the game software 16 from the CD-ROM 11 or incorporate them in the course of the progress of a game by setting the CD-ROM 11 at the CD-ROM device 11, so that it is possible to make a specified game progress.

On the other hand, the game apparatus 1 is provided with first means 20 for externally incorporating a scenario macro. This first means 20 is realized by, for example, using the above-mentioned attachment (a terminal adapter or a cable modem 5) for connection through the network 6 to the server (not shown). As a matter of course, as the first means 20, the VM 9 may be connected through the controller 8 to the game apparatus 1, thereby making the scenario macro SM to be incorporated from the VM 9 into the game apparatus 1. This scenario macro SM is composed of binary data in which procedures to process the scenario are listed.

The game apparatus 1 also comprises second means 30 for giving a command to the program 14, which is previously incorporated, by using the scenario macro SM incorporated externally by the first means 20, and for providing a new scenario by reusing the data group 13 previously incorporated. This second means 30 is composed of: a program code for interpreting the macro group 12 or the scenario macro SM incorporated externally; and a program code for conducting processing in accordance with abstracted action commands.

The game apparatus 1 then supplies image data and sound data, which are the results of the game progress processing, to a monitor 4.

Figure 5:
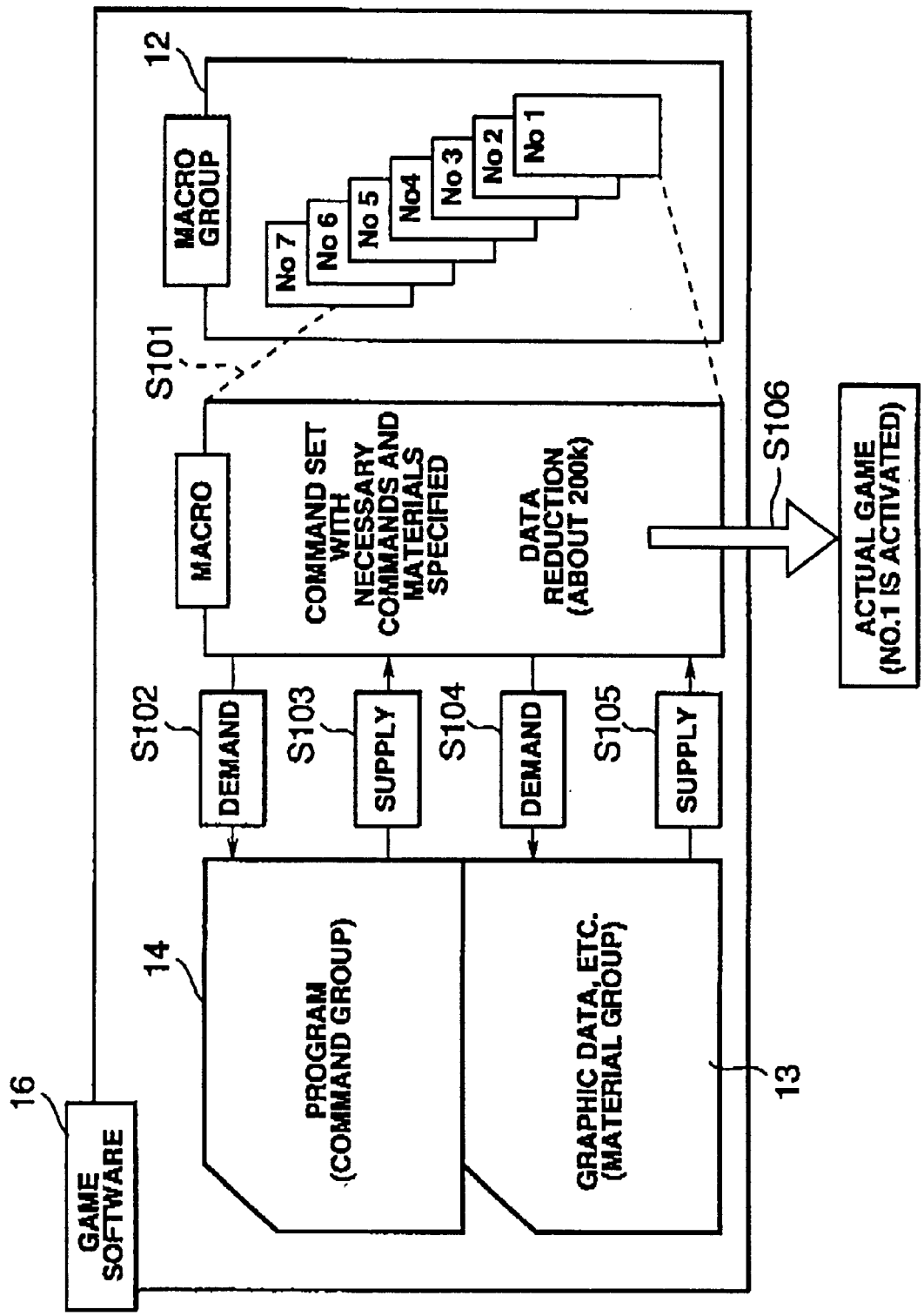
FIG. 5 is an explanatory diagram which shows an example of game software to be processed by the above-mentioned game apparatus.

The actions of the above-described game apparatus are hereinafter explained. FIG. 5 is an explanatory drawing illustrative of an example of game software to be processed by the game apparatus 1. The CPU 1a of the game apparatus 1 takes out, for example, one macro data MD1 from the macro group 12 with regard to a designated game in order to process a game program (step 101 (S101)). The CPU 1a gives a processing demand to the program 14 on the basis of the macro data MD1 (S102). The CPU 1a then receives the results of the processing from the program 14 (S103) and demands necessary data to the data group 13 (S104). Consequently, the CPU 1a receives data from the data group 13 (S105). Then, the CPU 1a which has received the data processes to make the actual game progress by using various kinds of data supplied in the previous steps from the data group 13 and the program 14 under the control of the macro data MD1 (S106). FIG. 5 shows that No. 1 macro data MD1 is activated.

Figure 6:
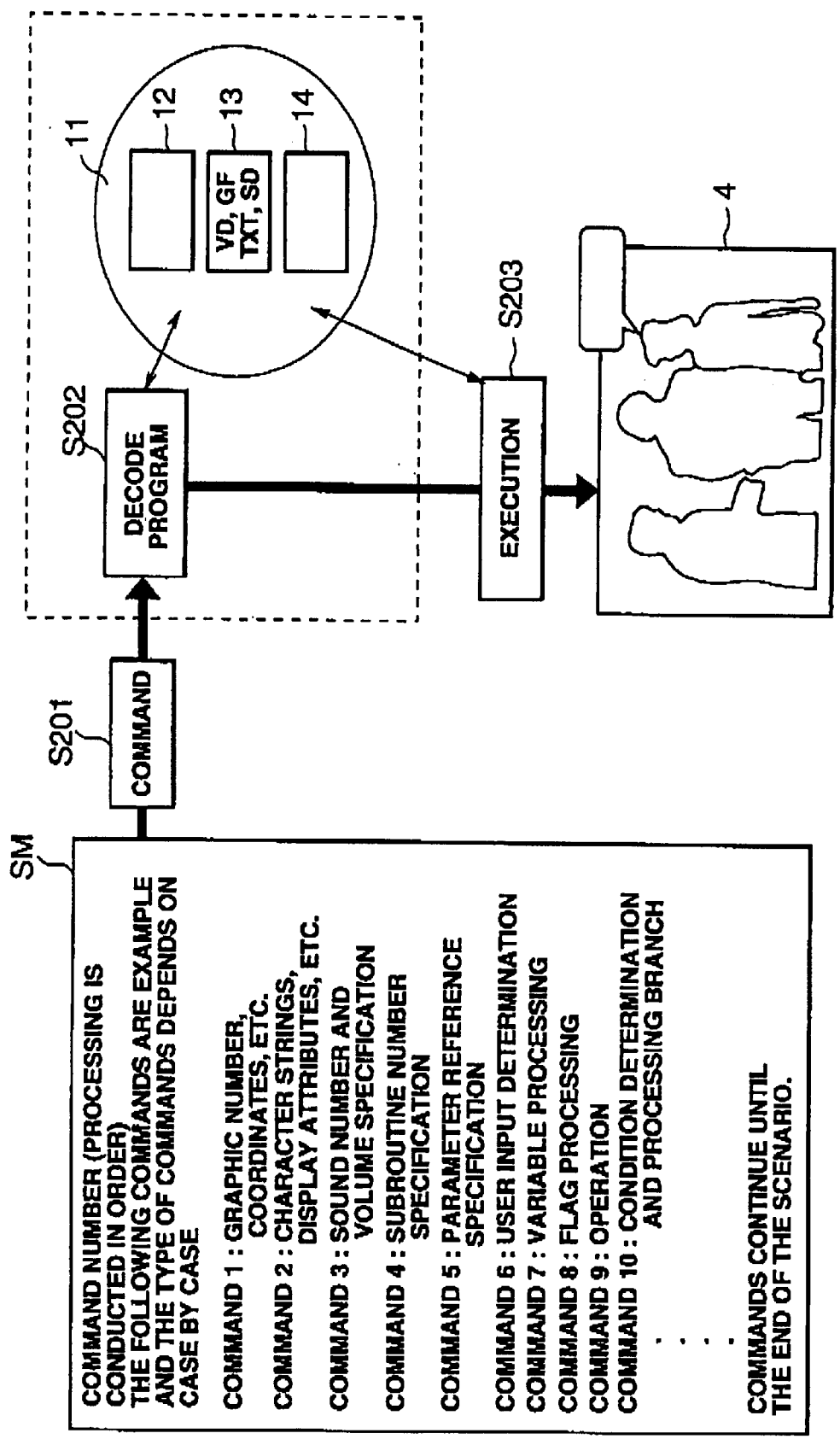
FIG. 6 is an explanatory diagram which explains the action of the game apparatus processing a scenario macro externally given to the game apparatus.

FIG. 6 is an explanatory diagram which explains the actions of the game apparatus to process the scenario macro externally given to the game apparatus. In this diagram, concerning the game apparatus 1, besides the macro group 12, the scenario macro SM externally incorporated into the game apparatus 1 is stored in the RAM 1e, and the game apparatus 1 receives a command from a player to execute the scenario macro SM.

This scenario macro SM is composed of commands (1), (2), (3) and so forth. Concerning the scenario macro SM shown in this diagram, a command (1) is described as "graphic number, coordinates and the like," a command (2) is described as "character strings, display attributes and the like," a command (3) is described as "sound number," a command (4) is described as "subroutine number specification," a command (5) is described as "parameter reference specification," a command (6) is described as "user input determination," a command (7) is described as "variable processing," a command (8) is described as "graph processing," a command (9) is described as "operation," and a command (10) is described as "condition determination and processing branch."

The CPU 1a takes out commands one after another from the scenario macro SM stored in the RAM 1e (S201) and executes a decode program (S202), thereby taking out video data VD, graphics GF, texts TXT, sound data SD and other information from the data group 13 as necessary in accordance with the progress of the game. The CPU 1a controls and executes the program 14 (S201), thereby displaying a game of a new scenario on the monitor 4 and producing sounds.

As described above, in the embodiment of this invention, the scenario macro SM is incorporated externally into the game apparatus 1 through the network 6 or a portable game device like the VM mentioned above, and the data group 13 and the program group 4 previously provided on the game apparatus 1 are then made to operate under the control of the scenario macro SM, thereby enabling the provision of a completely new game progress by reusing the various kinds of video data VD, graphics GF, texts TXT, sound data SD and other information of the data group 13.

Moreover, since the scenario macro SM of this embodiment is small in the data amount, it is possible to manage it efficiently even through network communication of slow transmission speeds.

Furthermore, since the scenario macro SM can be distributed by using the network 6, it is possible to provide a game application program and a game system at a very low price. It is also possible to obtain the scenario macro SM easily and in a short time by using the network 6 or the like.

Moreover, it is possible to realize the game progress of semi-infinite new contents by switching the scenario macro SM at the game apparatus 1.

(Second Embodiment)

A second embodiment of this invention will be described with reference to FIGS. 7 through 26. Reference will be also made to the drawings explained in the first embodiment as necessary.

In the first embodiment described above, the game apparatus and the game system are explained, which perform the game generation method of making a new game scenario progress by reusing the existing data group and program on the basis of the scenario macro externally obtained. However, in this second embodiment, an explanation will be given mainly about specific examples of a game which is caused to progress on the basis of the above-mentioned game generation method.

Hardware of a game apparatus according to this embodiment and of a game system using such a game apparatus, procedures to externally incorporate (for example, download) the scenario macro, and data processing procedures are the same with or similar to those of the first embodiment. Specifically, as explained in relation to FIG. 3, the scenario macro SM is provided by, for example, a first method of provision from the server 7 through the network 6 to the game apparatus 1, or a second method of provision from the memory card (VM) 9, which is connected to the controller 8 as the basic device, to the game apparatus 1.

The scenario macro SM so provided is stored in a CD-ROM 11 set at the CD-ROM device 1. Accordingly, the CD-ROM 11 stores the game software 16 as described in FIG. 4. Specifically, the game software 16 is made of: the macro group 12 (which composes the scenario macro SM and takes the form of commands) including the macro data MD1, MD2, etc. for commanding the procedures to process the scenario externally incorporated as hereinbefore described; the data group 13 consisting of video data VD, graphics GF, texts TXT, sound data SD, and other information used in accordance with the progress of the scenario; the program 14 to cause the CPU 1a to make the game progress by using the data group 13 on the basis of commands of the macro group 12; and the flag 15.

If the CD-ROM 11 already stores a macro group which forms another scenario macro, the macro group that has been newly incorporated is stored in the CD-ROM 11 as an additional game, As for this additional game, the data and program already stored in the CD-ROM 11 are used as the game main body. Accordingly, it is possible to provide a wide range of game types by effectively utilizing the existing game resources in the game apparatus 1 merely by externally incorporating the scenario macro, which uses the macro data having a small data amount, as additional questions.

As stated above, the macro data MD1, MD2, etc. of the macro group 12 respectively include enumerated procedures of the game processing as commands. Accordingly, the CPU 1a automatically interprets the macro data by executing the commands, and executes the program code in accordance with the macro data, and then executes the predetermined processing in order. The specific processing method is as described in FIG. 5.

In this second embodiment, the scenario macro SM which is provided as described above is data of additional questions for a mini-game which is provided by the first provision method. The game apparatus 1 automatically creates a new mini-game and makes it progress by reusing a puzzle game (a game body consisting of a data group and its program), which is one of the already stored main games, on the basis of the scenario macro SM.

Figure 25:
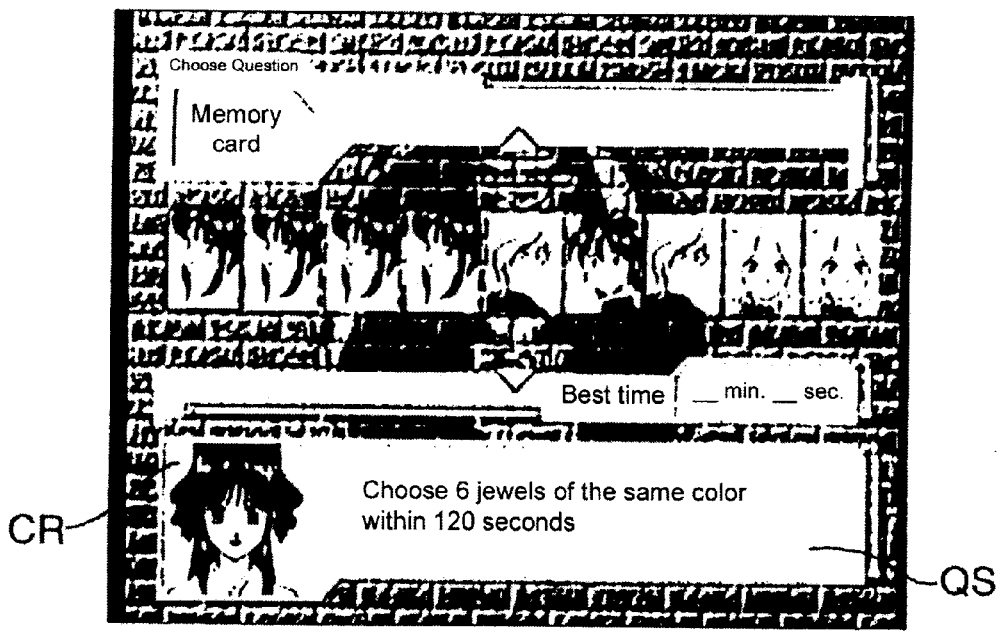
FIG. 25 shows an example of an initial screen display of the jewel game.
Figure 26:
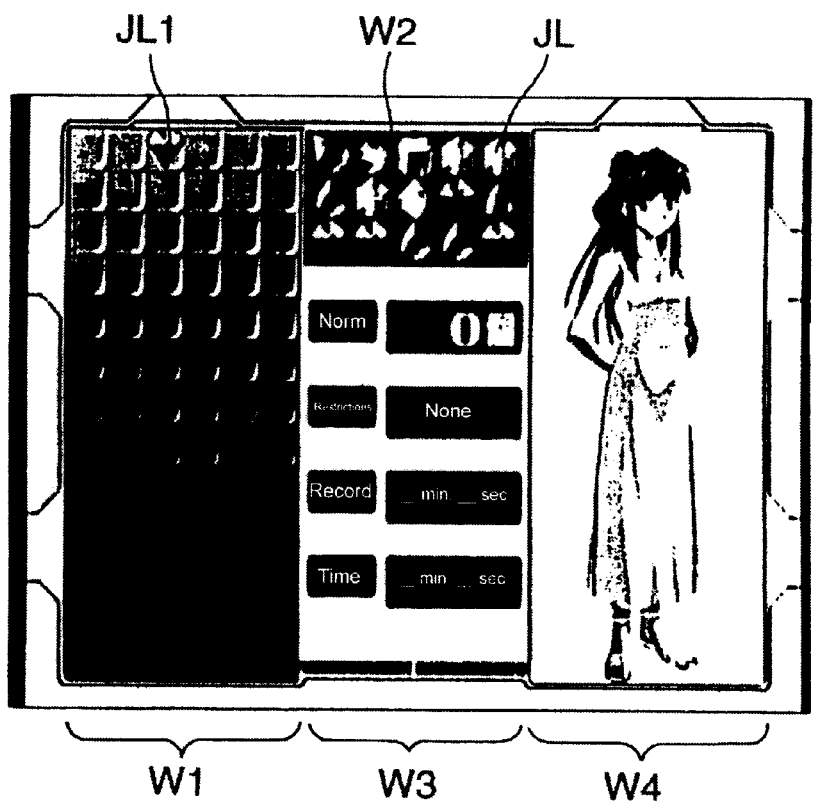
FIG. 26 shows an example of a screen display of the jewel game.

In this second embodiment, as shown in FIGS. 25 and 26, a so-called "jewel game" (or sometimes called a "jewel puzzle") is provided as the mini-game, which requires a player to perform various operations (for example, to delete a given number of jewels of the same color at the same time) while jewels are caused to fall down on a monitor screen. In this jewel game, jewels JL are treated as moving objects on the screen, which include those of various colors, shapes, and types. A character CR is an object which, for example, addresses questions QS on the jewel game screen as illustrated in FIG. 25, and which is formed by computer graphics.

The mini-game which can be added as described above is not limited to the jewel game, but may be any kind of games as long as they can have a new game progress by reusing the already stored program and data group merely by externally incorporating the scenario macro.

The CPU 1a controls the processing to externally incorporate the jewel game and the processing of further game progress. The flowcharts of FIGS. 7 through 9 indicate the outlines of examples of the control to be performed in response to operation information from a player while the CPU 1a executes the main processing which is not shown in the drawings. The processing based on these flowcharts will be described with reference to screen display examples of the monitor 4 as necessary.

Figure 7:
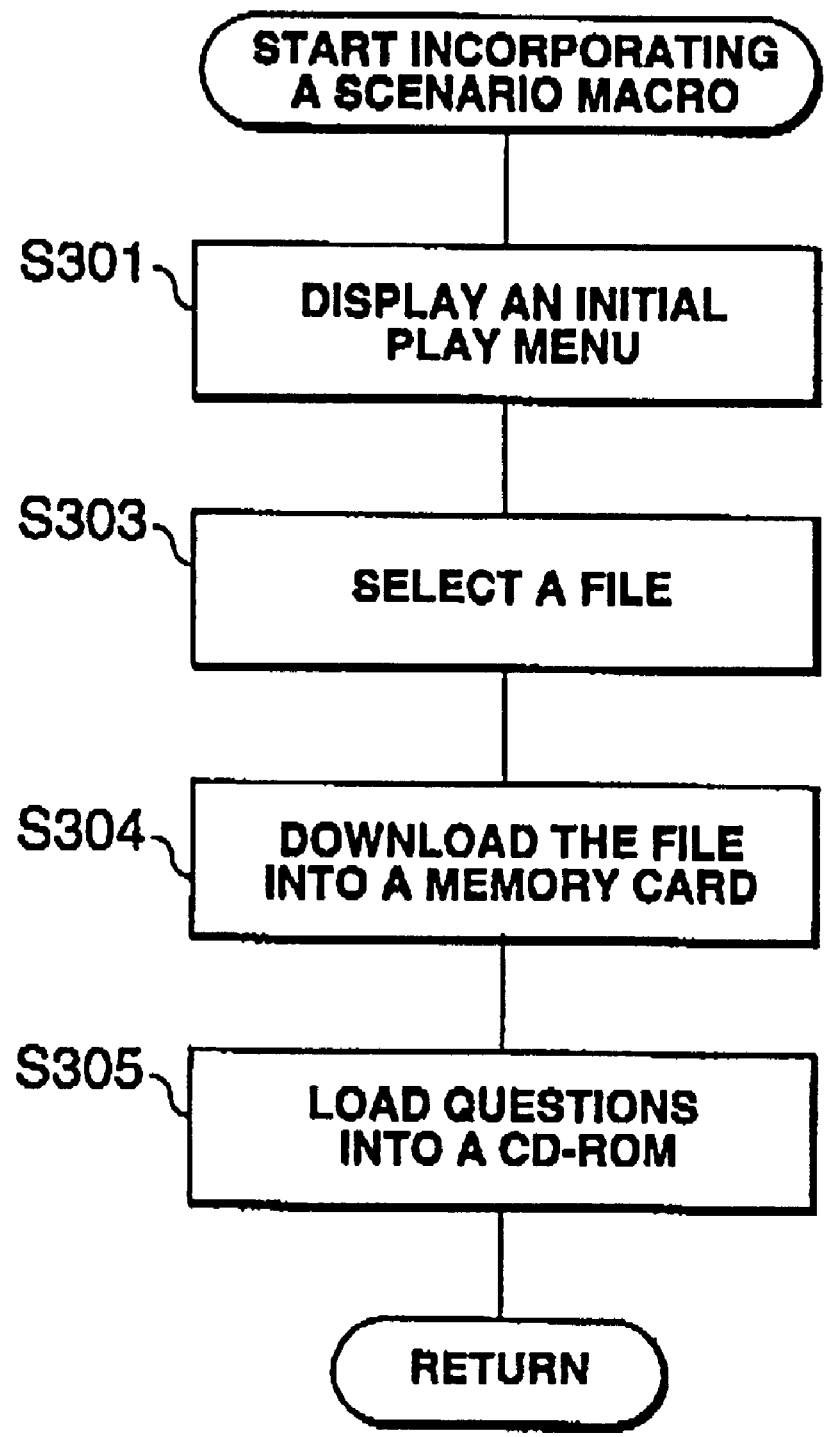
FIG. 7 is a flowchart which indicates the outline of procedures to download the scenario macro according to a second embodiment of this invention.

FIG. 7 indicates the technique of employing the aforementioned first provision method to incorporate the scenario macro SM to be executed by the CPU 1a, that is, the method of downloading the scenario macro SM from the server 7 through the network 6.

Figure 11:
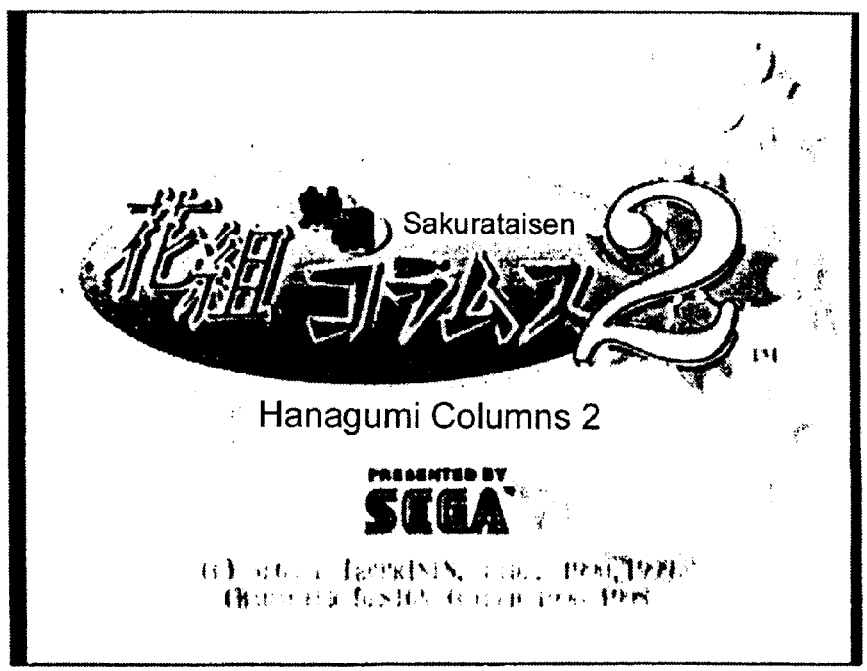
FIG. 11 shows an example of a screen display upon downloading the scenario macro.
Figure 12:
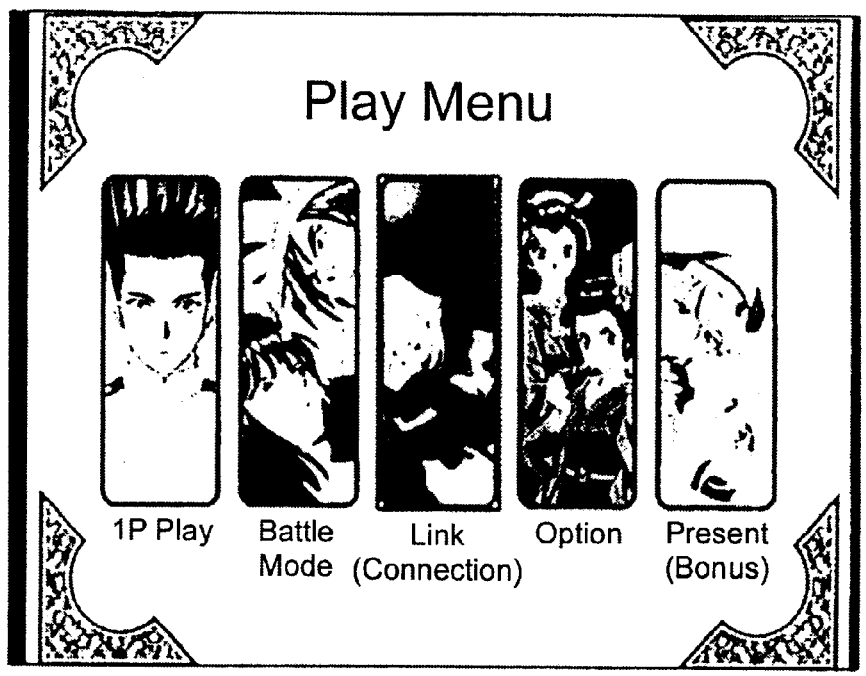
FIG. 12 shows an example of a screen display upon downloading the scenario macro.

First, a title screen appears as shown in FIG. 11; and a specified initial play menu is then displayed as shown in FIG. 12 (Step S301 in FIG. 7). This menu contains a menu of various games, which the game apparatus already has, and other related menus such as "1P play," "match mode," "communication," "options," and "presents."

Figure 13:
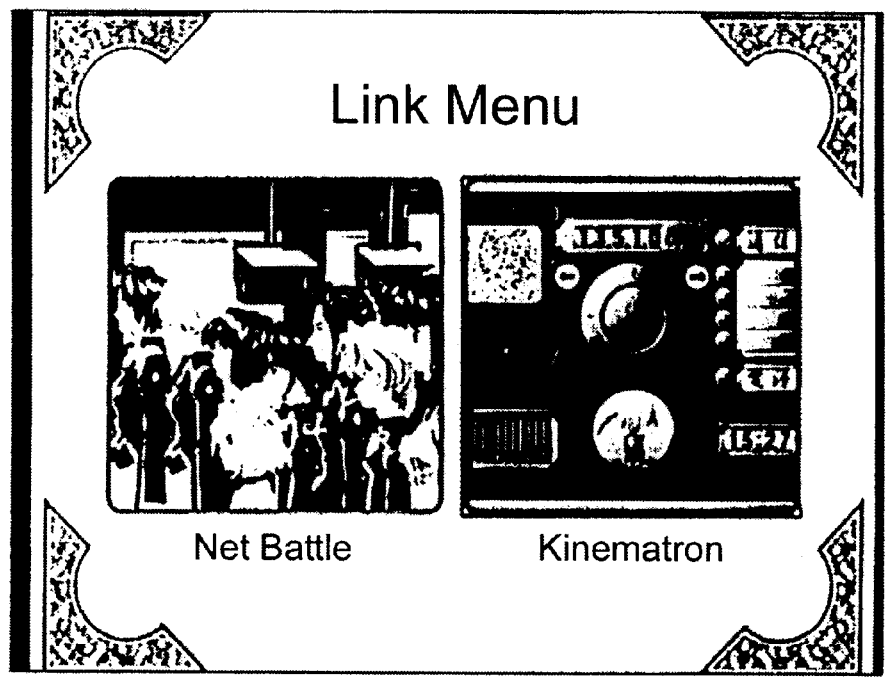
FIG. 13 shows an example of a screen display upon downloading the scenario macro.
Figure 14:
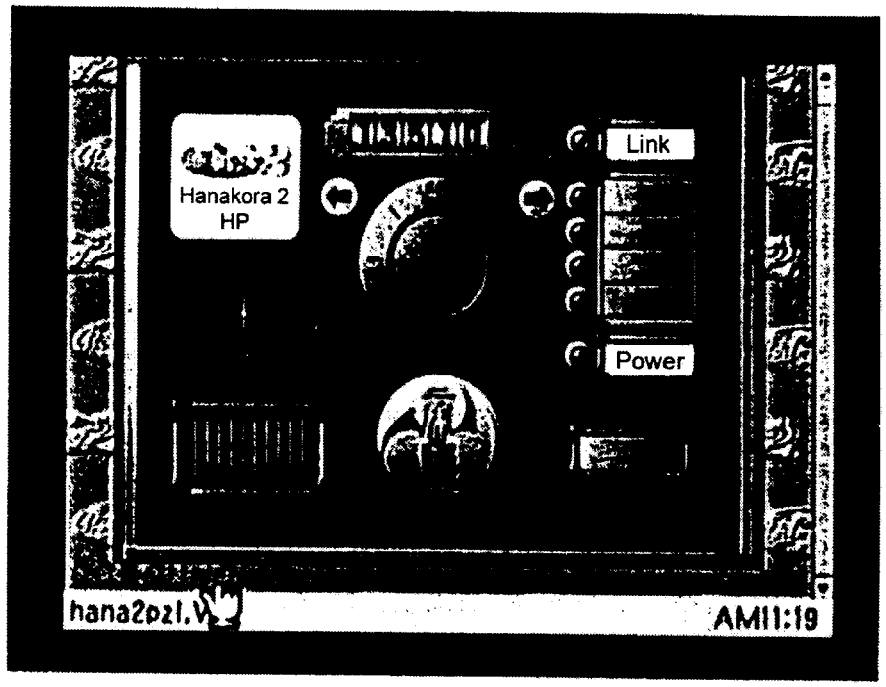
FIG. 14 shows an example of a screen display upon downloading the scenario macro.
Figure 15:
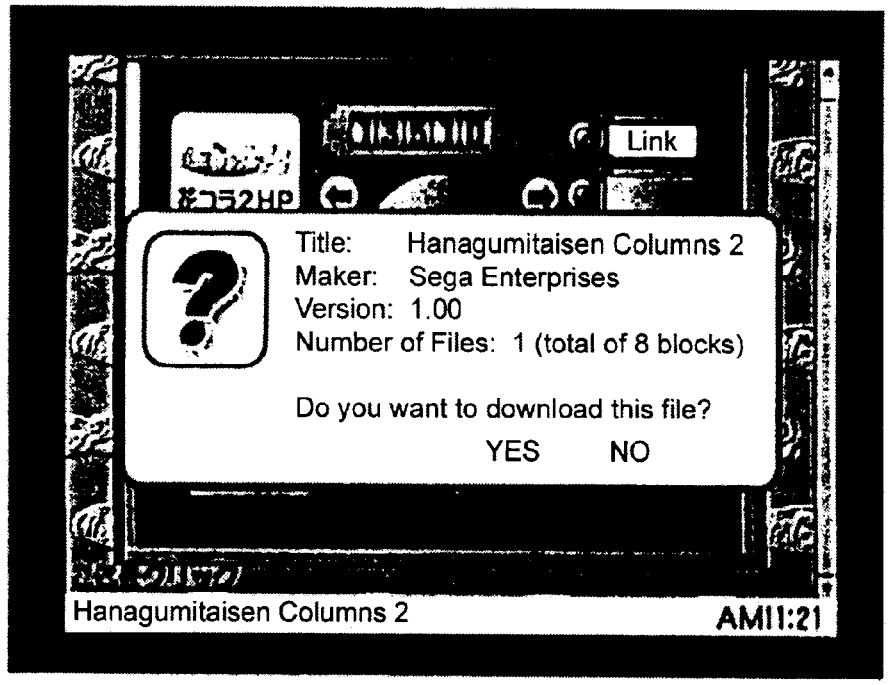
FIG. 15 shows an example of a screen display upon downloading the scenario macro.

Subsequently, a file to be externally incorporated as an additional mini-game into the game apparatus 1 is selected (Step S302). For the purpose of this selection, the CPU 1a displays the "communication" menu (ref. FIG. 13) selected by the player from the initial play menu, and then displays a "cinematron" menu (ref. FIG. 14) selected by the player from the "communication" menu, and further has the player select a mini-game with a desirable title from the "cinematron" menu (ref. FIG. 15). As the mini-game, it is herein assumed that the player selects the above-mentioned "jewel game."

After a file of the "jewel game" is selected, the CPU 1a downloads the file into the memory card 9 (VM, sometimes called a visual memory) set on the controller 8 (Step S304).

Figure 16:
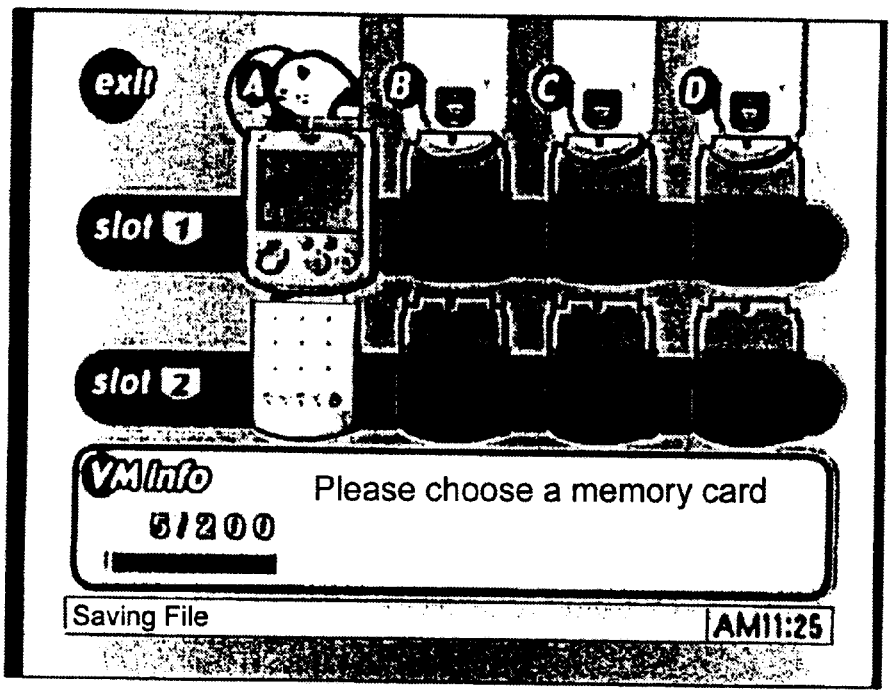
FIG. 16 shows an example of a screen display upon downloading the scenario macro.
Figure 17:
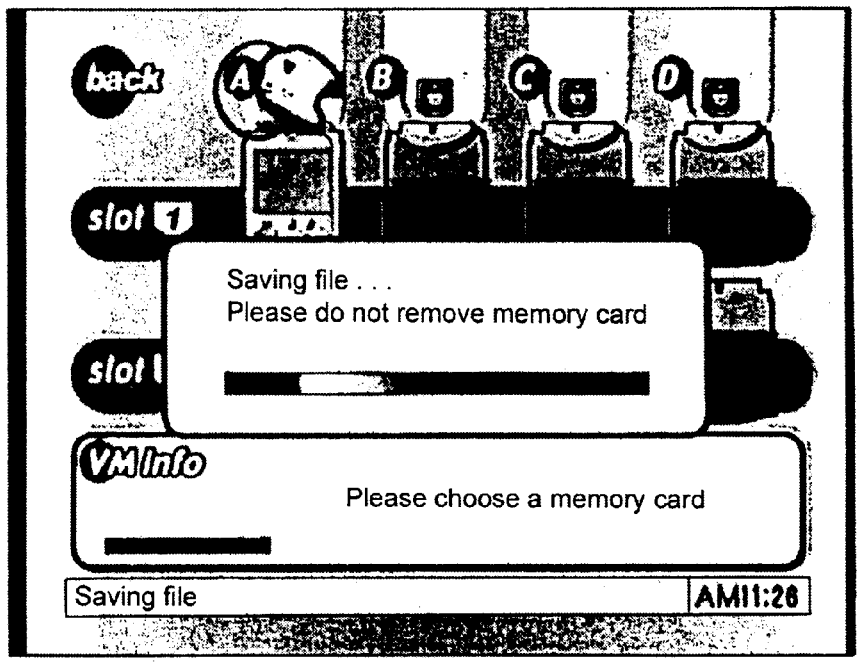
FIG. 17 shows an example of a screen display upon downloading the scenario macro.
Figure 18:
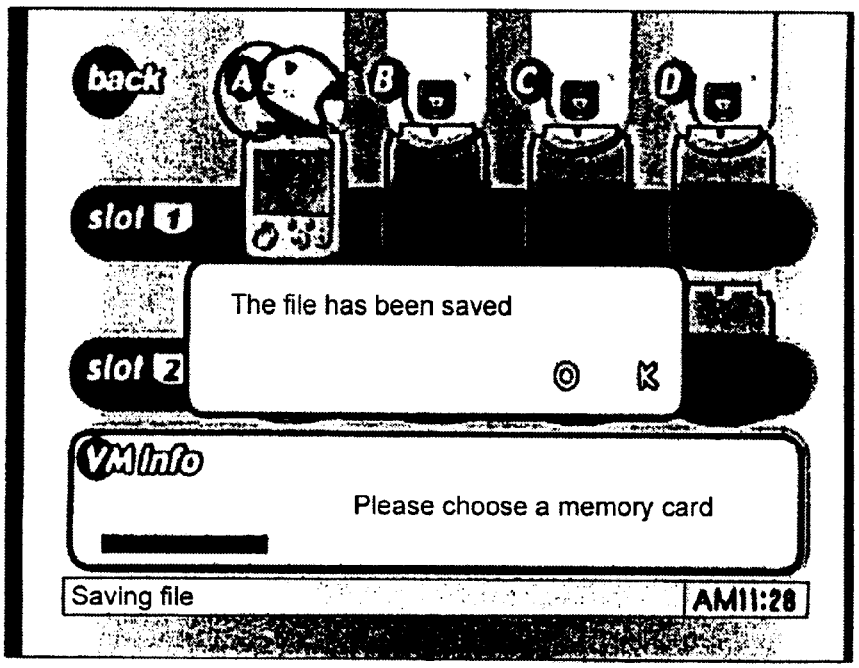
FIG. 18 shows an example of a screen display upon downloading the scenario macro.

Specifically speaking, a desirable memory card 9 is selected among the memory cards 9 which can be set in four slots in each one of two controllers 8 connected to one game apparatus 1 (ref. FIG. 16). The above-mentioned file is then downloaded from the server 7 through the network 6 into the selected memory card 9 (ref. FIGS. 17 and 18).

Figure 10:
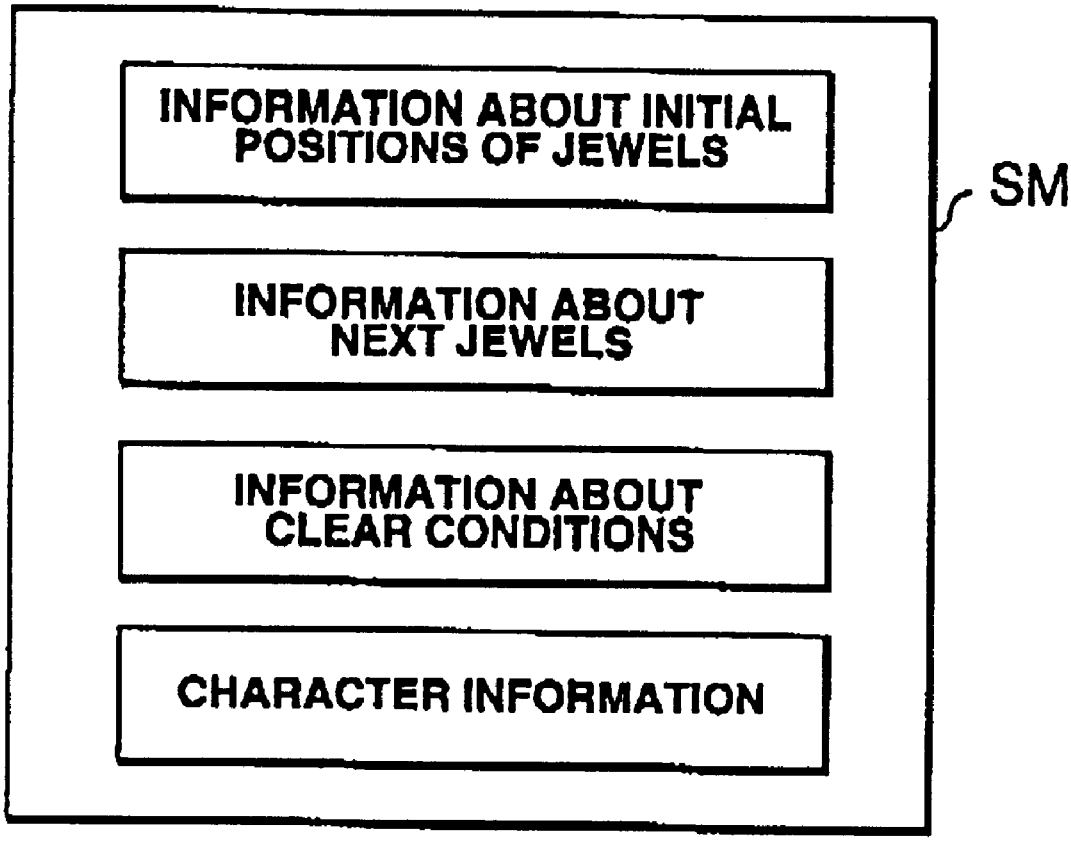
FIG. 10 is an explanatory drawing illustrative of a data structure of the scenario macro to be downloaded for the jewel game.

As for information of the scenario macro SM for the jewel game, which is downloaded as additional questions as described above, for example, nine questions constitute one set, which is composed of data that represents information about the initial positions of jewels, information about the next jewels, information about clear conditions, and character information as shown in FIG. 10.

Among the above-described information, the information about the initial positions of jewels is information about the coordinates and type of the jewels JL (ref. FIG. 26) as objects which are initially placed at the beginning of the jewel game. The information about the next jewels is information about jewels which will start to fall down on the screen at the same time as the game starts, and the options are prepared to choose whether the jewels should be made to fall down randomly or in certain combination.

The information about clear conditions is information that serves as criteria of judgment as to whether the game is cleared or not. This information contains (A) items representing limitations and (B) items representing a quota (game conditions to be imposed on the player), and the clear conditions are decided by a combination of these items. The (A) items representing limitations include "no limitation," "time limitation," and "number of times to make jewels fall down." On the other hand, the (B) items representing the quota include "delete 'n and more' jewels in a cumulative total," "cause a 'chain of the same n or more jewels' to take place," "delete 'n or more jewels at the same time,'" "lower jewels to a specified line," "delete all bright jewels," and "delete all jewels." Of these items, data previously stored in the CD-ROM 11 is used for key words such as "or more," while values downloaded into the memory card are used for data such as the number of times and the number of objects.

Moreover, the character information is information which represents the type of the character that addresses questions of the game (puzzle). This information also includes tone ending data according to the type of the character. The Japanese ending data is the data which represents the Japanese endings of gentle (sweet) language (for example, "Please delete it") if the character is a girl, and which represents the Japanese endings of comparatively brusque and rough language (for example, "Delete it!") if the character is a man.

This character information is used to decide BGM, voice, and CG in the game. BGM is background music to be played during the jewel game. The voice indicates the type of voice when the character CR reads out the questions QS. the CG indicates the type of characters CR to be created by computer graphics. The questions QS are also displayed as texts on the screen.

Figure 19:
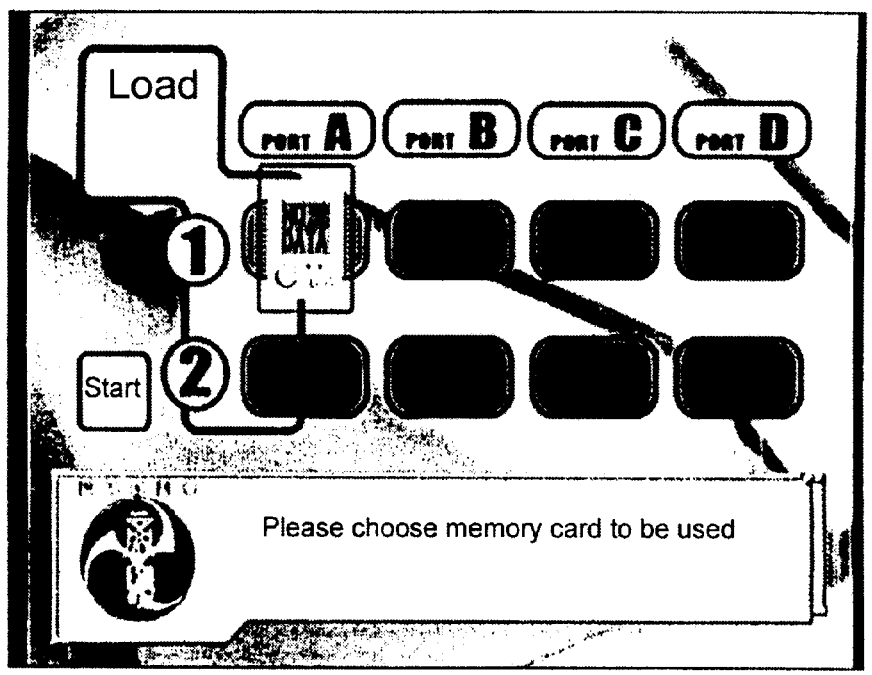
FIG. 19 shows an example of a screen display upon loading questions into a CD-ROM.
Figure 20:
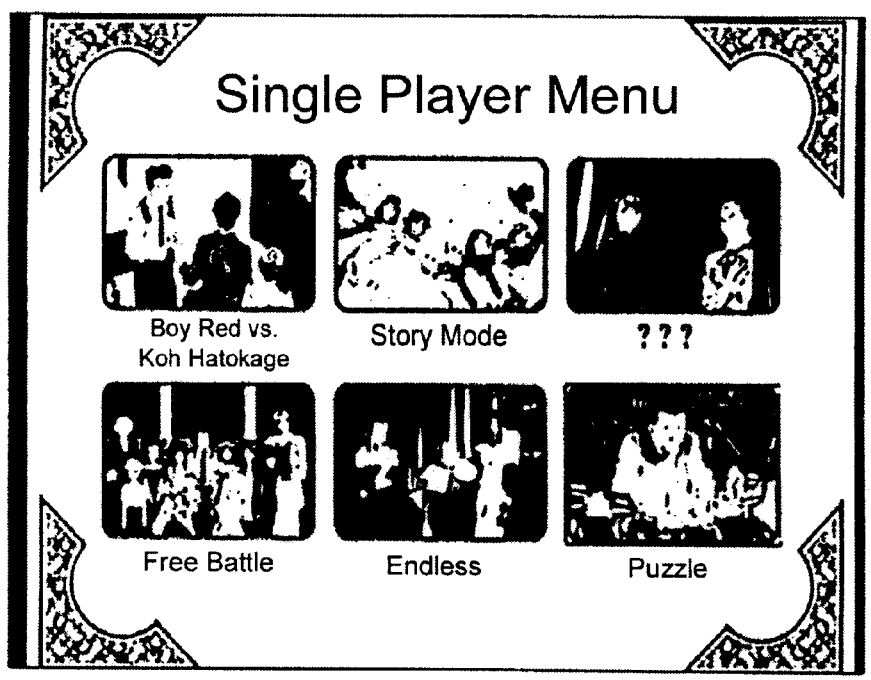
FIG. 20 shows an example of a screen display upon loading questions into the CD-ROM.
Figure 21:
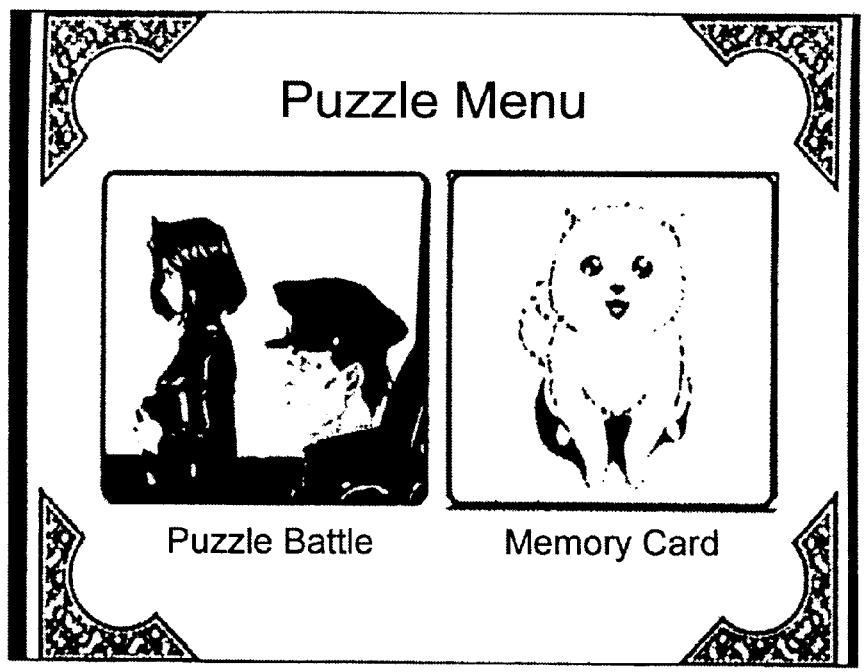
FIG. 21 shows an example of a screen display upon loading the questions into the CD-ROM.
Figure 22:
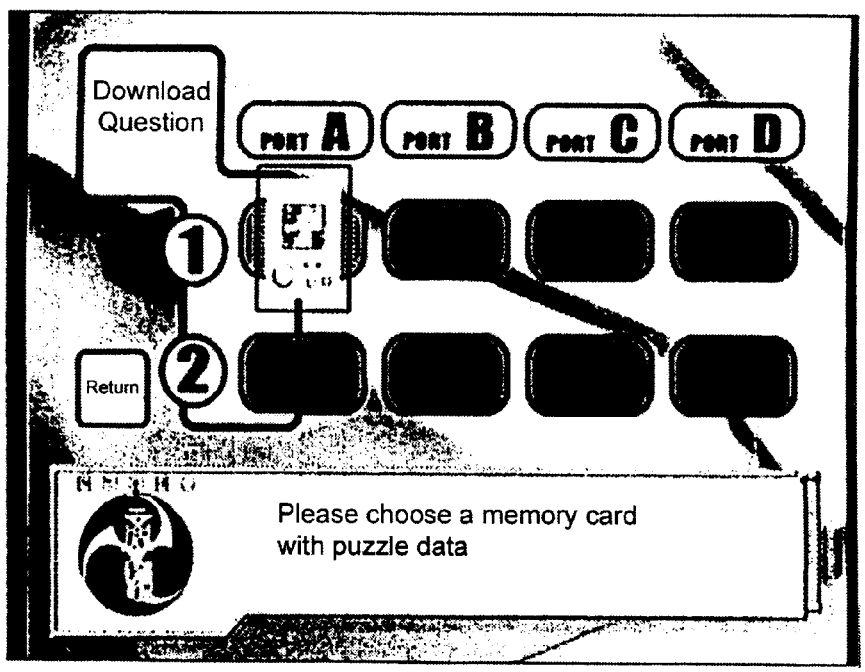
FIG. 22 shows an example of a screen display upon loading the questions into the CD-ROM.

When the external incorporation (downloading) of the scenario macro SM has been finished as described above, the questions are then loaded (Step S305). Specifically, the memory card 9 to be used for the loading of the questions is selected (ref. FIG. 19), and then a "1P play menu" is displayed (ref. FIG. 20). Subsequently, a "puzzle menu" selected by the player from the "1P play menu" is displayed (ref. FIG. 21). If a "memory card" menu in the puzzle menu is selected, patterns of eight memory cards are displayed, among which the memory card 9 having the puzzle data already stored thereon is then selected (ref. FIG. 22).

Figure 23:
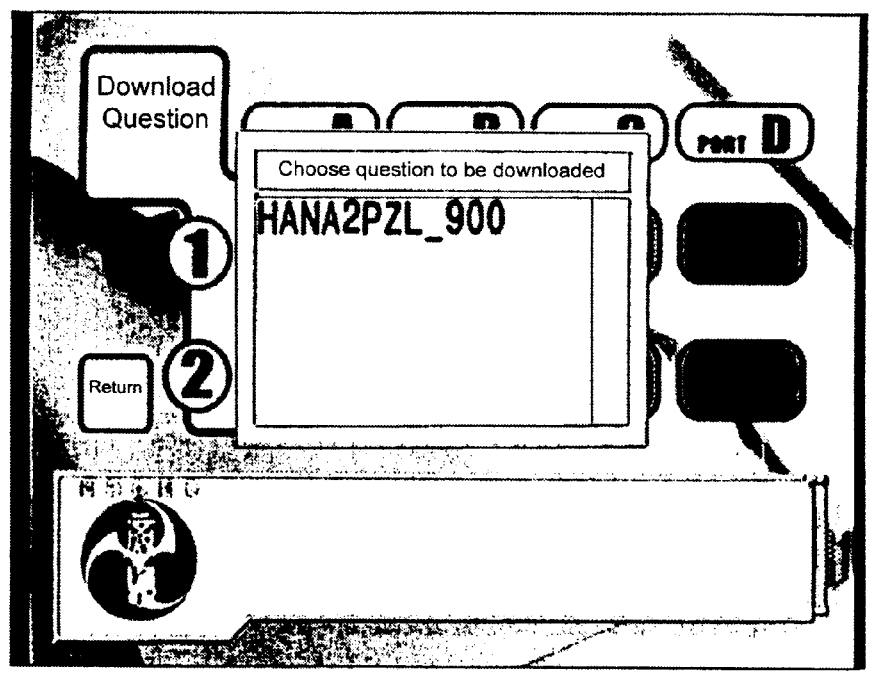
FIG. 23 shows an example of a screen display upon loading the questions into the CD-ROM.
Figure 24:
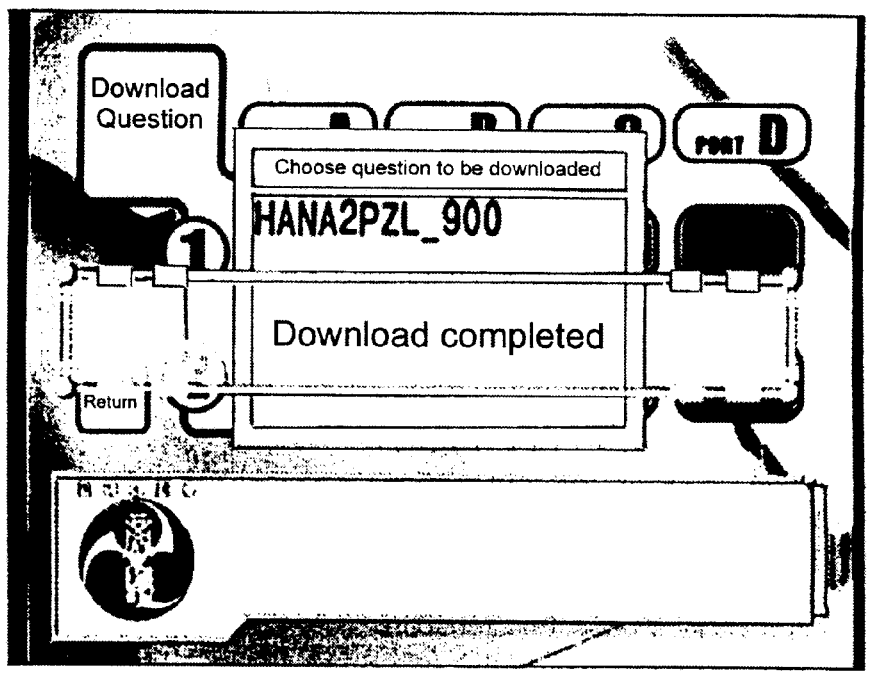
FIG. 24 shows an example of a screen display upon loading the questions into the CD-ROM.

In response to the selection of questions to be loaded and the command to start the loading, the selected questions are loaded from the memory card 9 into the CD-ROM 11 (ref. FIGS. 23 and 24).

Figure 8:
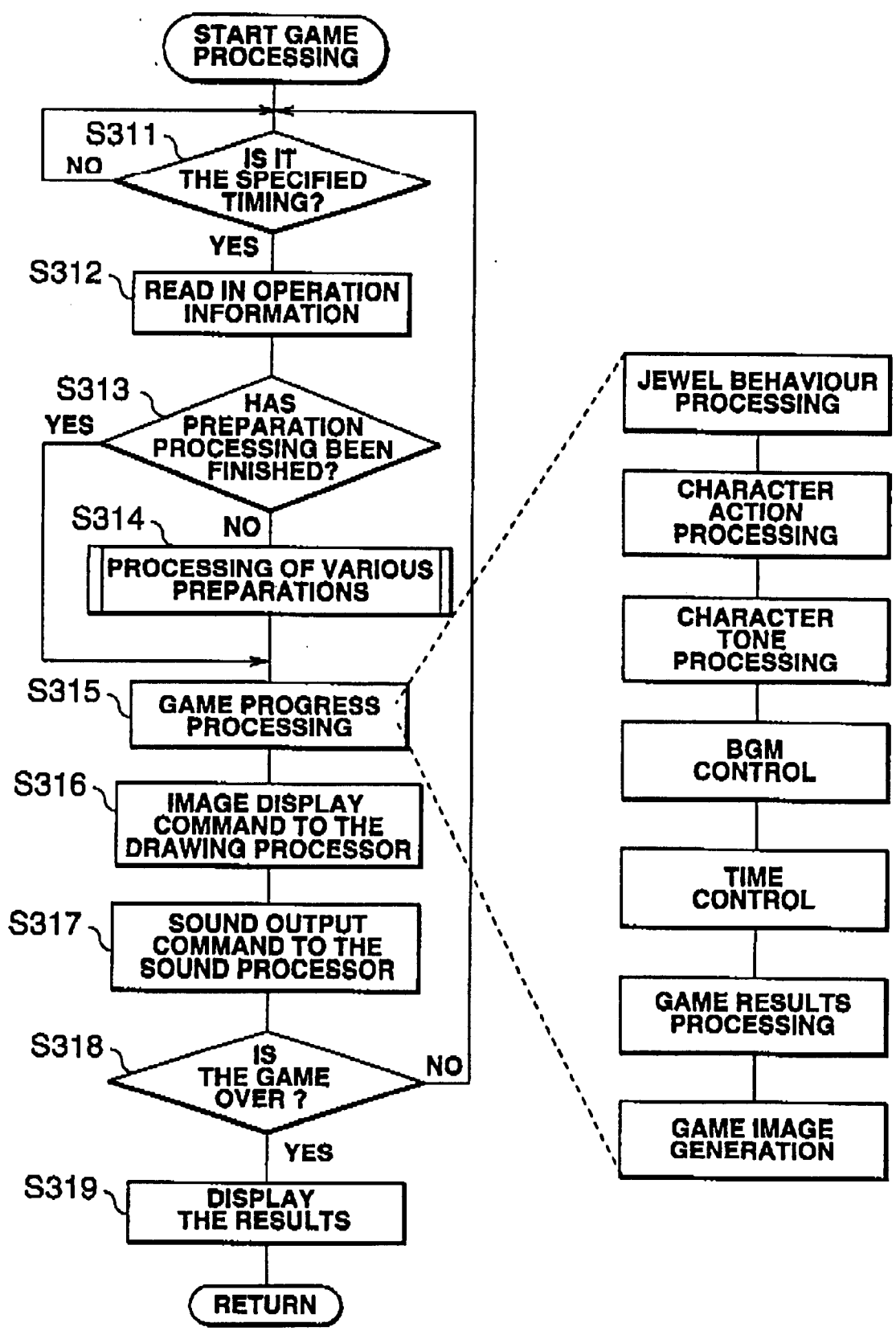
FIG. 8 is a flowchart which indicates the outline of game processing for a jewel game according to the second embodiment of this invention.

Moreover, the CPU 1a performs the game processing by executing the procedures as shown in FIG. 8.

This game processing is performed at every fixed timing (Step S311 in FIG. 8). When this processing starts, operation information associated with the player's operation of the controller 8 is first read in (Step S312). This operation information is used later for -game preparation processing and game progress processing.

Subsequently, it is determined according to, for example, the flag whether or not the game preparation processing has been performed (Step S313). If the result of this determination is YES (the preparation processing has been performed), the next step S314 will be skipped. On the other hand, if the result of the determination is NO (the preparation processing has not been performed), processing to prepare various items related to the jewel game is performed (Step S314).

Figure 9:
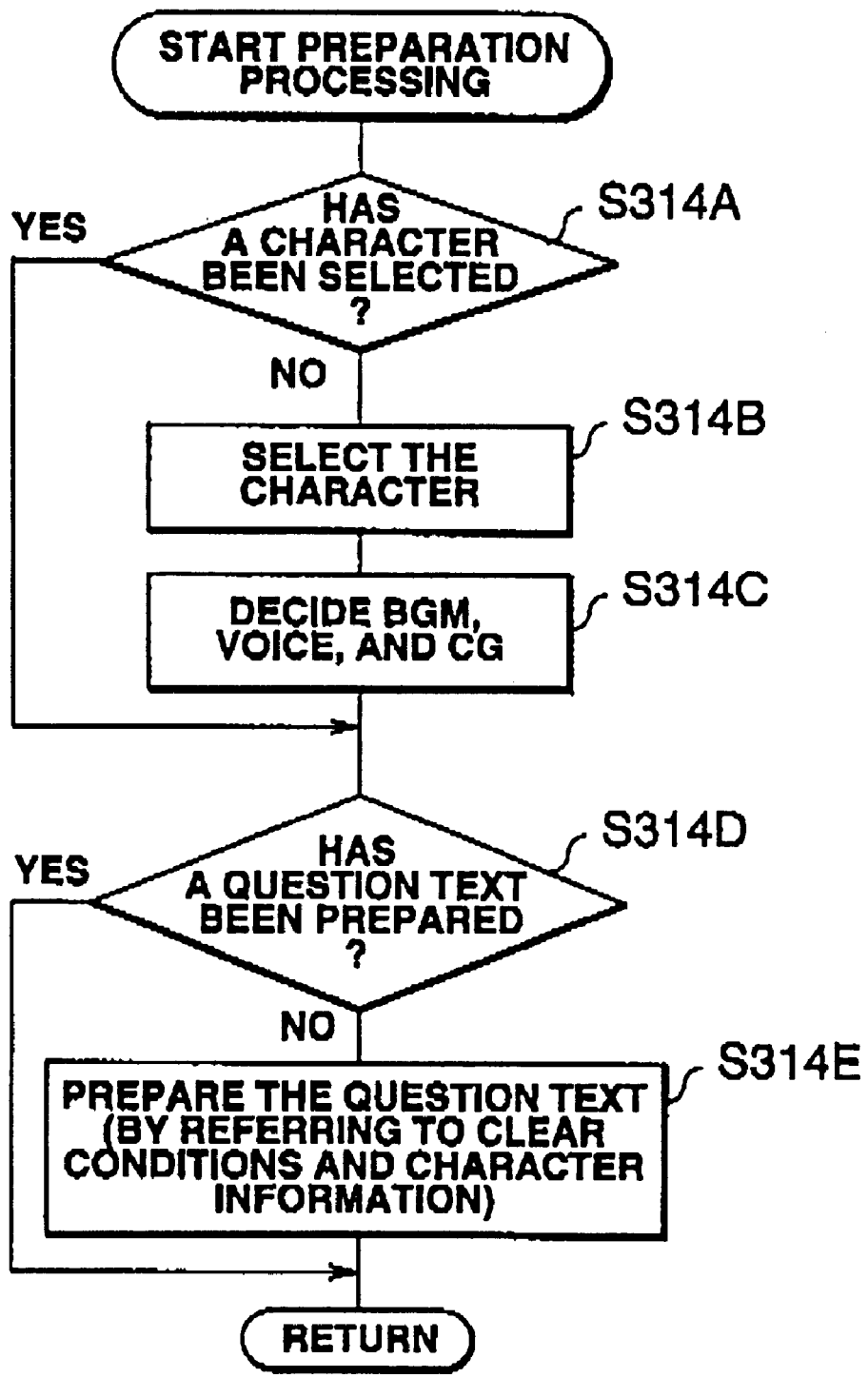
FIG. 9 is a flowchart which indicates the outline of a subroutine to be run in the game processing for the jewel game.

This game preparation processing is executed as a subroutine indicated in FIG. 9. Specifically, it is first determined whether or not the character has been selected (Step S314A). If the result of the determination is NO, the player is made to select the character and to decide the BGM, voice, and CG (Steps S314B and S314C). On the other hand, if the result of the determination is YES, the processing in Steps S314B and S314C is omitted.

Furthermore, as another item of game preparing operation, question text processing is performed. It is determined whether or not a question text has been prepared (Step S314D). In the case of NO, the question text is prepared automatically by referring to the clear conditions and the character information (Step S314E). On the other hand, if the result of the determination at Step S314D is YES, the processing in Step S314E is omitted.

The processing of the CPU 1a then returns to Step S315 in FIG. 8 and the game progress processing of the jewel game is executed by incorporating the operation information. Specifically, for example, the following processing are performed: processing to cause the operation information provided by the player in response to the questions to reflect the behaviors of the jewels as the objects; processing of actions of the character CR which is composed of CG data; tone processing of the character CR; processing of output modes such as tempos of BGM in accordance with the game progress; time count; game results processing; and game image generation.

Image displays which reflect the above-described game progress processing are then output to the drawing processor (Step S316), which is followed by the output of sounds that reflect the game progress processing to the sound processor 1g (Step S317).

It is then determined on the basis of the operation information and the clear conditions whether or not the jewel game is over (Step S318). If the result of this determination is NO, the processing returns to Step S311 described above and the processing of steps S311 through S318 is repeated at every specified timing. Accordingly, the image data and sound data which are sequentially updated are sent from the drawing processor 1f and the sound processor 1g to the monitor 4 and its speaker in synchronization with the specified display timing. Consequently, it is possible to obtain on the monitor 4 the images and sounds that reflect the game progress and are in synchronization with each other.

On the other hand, if it is determined that the processing is over (in the case of YES at Step S318), a command to display the player's game results of the jewel game at that time is sent to the drawing processor 1f and/or the sound processor 1q (Step S319). Consequently, the game results will be output by images and/or sounds. The CPU 1g processing then returns to the main routine.

The CPU 1g performs the above-described processing. Accordingly, questions are selected from the scenario macro SM which has been externally downloaded, and the questions are loaded onto the CD-ROM 11. Based on the questions made of the macro data, the existing program and data group for the puzzle game are reused to prepare the question text.

Therefore, at the beginning of the game, an initial screen, for example, as shown in FIG. 25 is displayed on the monitor 4, where the question text QS is displayed together with the selected character CR. This question text QS is letter information stating, for example, "please delete six jewels of the same color at the same time within 120 seconds."

This question text QS is simultaneously generated also as sound. At this time, since the expression and actions of the character CR are controlled in synchronization with the sound generation, the sound is expressed as if the character CR were speaking.

If the character CR is, for example, a man instead of a girl, the Japanese ending of the question text changes to, for example, "Delete six jewels of the same color at the same time within 120 seconds," and the sound is generated accordingly.

Such an initial screen is followed by a screen where the jewels JL as objects begin to fall down. As shown in FIG. 26, on this screen, a long lattice-patterned window W1 is formed on the left side thereof, a standby jewel window W2 and various windows W3, which show the quota, limitations, records, and time information of the game, are formed in the riddle of the screen, and a window W4 which shows a CG image of the character CR is formed on the right side of the screen.

From the top to the bottom of the lattice-patterned window W1, for example, the brightness gradually changes from bright to dim or the color tone gradually changes from light to dark. Moreover, the standby jewel window W2 shows the jewels JL which are to fall down next time and has, for example, fifteen jewels JL in a matrix of 3×5.

The jewels JL fall down from the top in a substantially middle column of the lattice-patterned window W1 at given speeds (ref. JL1 in FIG. 26). There are various ways of falling down. Some fall down straight, and some turn to either right or left on the way. The jewels JL may fall in the order starting from the left column containing three jewels in the window W2, or in the order randomly selected from the window W2. Every time the jewels JL fall down, new jewels JL are scrolled up from the right side of the window W2.

Watching this screen, the player operates the controller 8 in accordance with the given question text QS. If the clear conditions are met, it is possible to achieve specified game results, which are then displayed.

The game apparatus and the game system of this embodiment are structured as described above and operate accordingly. Consequently, it is possible to incorporate additional questions of the puzzle game easily and in a short time on the basis of the incorporation of the scenario macro as described in the first embodiment, and to easily add a new mini-game based on the above-obtained questions to the game apparatus. Therefore, since the existing data in the game apparatus can be reused, it is possible to enhance the functions of the existing game apparatus and to achieve the generalization of the game apparatus. Consequently, it is possible to easily provide a new game to a player while saving manpower necessary for the game development and sales activity.

Moreover, since games which tend to deal with questions of a player's tastes can be added, it is possible to provide a game apparatus which can suit to the tastes of individuals. In this case, it is possible to easily change the scenario in the state where a player cannot see the entire progress of the game beforehand. Therefore, it is possible to keep the game freshly appealing to players.

Furthermore, as for the jewel game, the standby jewel window W2 shows the next jewels JL, which will whet the player's appetite for playing the game. Also, since the character CR appears on the screen and addresses the question text QS to the player, the player can feel familiar with the character. Accordingly, the game will not end up as just a puzzle, but it is possible to raise the player's interest in the game and to prevent the game from becoming boring.

This invention is not limited to the above-described embodiments. It is certain that those skilled in the art can adopt further variations on the basis of the content of the scope of claims.

As described above, the game apparatus of this invention gives the following advantageous effects.

(1) As described above, in the embodiments of this invention, the scenario macro of, for example, a puzzle game is incorporated externally into a target game apparatus. through a communication network or a recording medium, and the data group and the program previously provided on the game apparatus are then made to operate under the control of the scenario macro, thereby making it possible to easily provide a scenario of a completely new game progress by reusing the various kinds of data of the data group and other information. Accordingly, it is possible to easily add a new game to the existing game apparatus.

(2) Moreover, since it is unnecessary to renew the contents every time with the game apparatus of this invention, it is possible to save game resources.

(3) Furthermore, the game apparatus of this invention can receive the provision of a game of semi-infinite new contents merely by switching the scenario macro.

The game system of this invention gives the following advantageous effects.

(1) since the scenario macro of the game system of this invention is small in capacity, it is possible to manage the progress of a game through a network communication.

(2) since with the game system of this invention the scenario macro of, for example, a puzzle game can be distributed by using a communication network or the like, it is possible to provide the game system at a very low price.

(3) furthermore, with the game system of this invention, it is possible to obtain the scenario macro easily and in a short time by using a communication network or the like.

What is claimed is:

1. A game apparatus comprising:

means for storing a macro group comprising a sequence of one or more macro data procedures, each procedure having a game scenario described therein for commanding the processing procedures of the scenario;

means for storing a data group including video data, graphics, texts and other information used in accordance with the progress of the game scenario;

means for storing a program to cause processing means to make a game progress by using the data group on the basis of a command of the macro group;

first means for externally incorporating a scenario macro; and second means for giving a command to the program on the basis of the scenario macro obtained externally by the first means and for providing a game of a new scenario by reusing the data group.

2. A game apparatus according to claim 1, wherein the first means comprises means for externally incorporating the scenario macro by using a communication network or a recording medium.

3. A game apparatus according to claim 1, wherein the second means comprises: a program code for interpreting the macro group or the scenario macro; and a program code for conducting processing in accordance with an abstracted action command.

4. A game apparatus according to claim 1, wherein the scenario macro is binary data in which procedures for processing the scenario are listed.

5. A game apparatus according to claim 1, wherein the scenario macro is macro data for controlling the progress of the scenario of a puzzle game application.

6. A game apparatus according to claim 5, wherein the puzzle game is a game which requires a player to operate an object moving in images on a monitor screen in accordance with a question.

7. A game apparatus according to claim 6, wherein the scenario macro is composed of information about an initial position of the object, information to display the object at a next time, information to clear the game, and information about a character to appear in the game.

8. A game apparatus according to claim 7, wherein the second means comprises means for automatically preparing a question text by using the clear game information and character information.

9. A game apparatus according to claim 8, wherein the second means comprises inflection means for changing the ending of question text according to a type of the character.

10. A game apparatus according to any one of claims 6 through 9, wherein the object is displayed as a jewel caused to fall down from the top of an image on the monitor screen.

11. A game system comprising:

a game apparatus which comprises:

means for storing a macro group comprising a sequence of one or more macro data procedures, each procedure having a game scenario described therein for commanding the processing procedures of the scenario, a data group including video data, graphics, texts and other information used in accordance with the progress of the game scenario, and a program to cause processing means to make a game progress by using the data group on the basis of the command of the macro group;

first means for externally incorporating a scenario macro; and second means for giving a command to the program by means of the scenario macro obtained externally by the first means and for providing a new scenario by reusing the data group; and distribution means of distributing the scenario macro to the game apparatus.

12. A game apparatus according to claim 11, wherein the first means comprises means for externally incorporating the scenario macro by using a communication network or a recording medium.

13. A game apparatus according to claim 11, wherein the second means comprises: a program code for interpreting the macro group or the scenario macro; and a program code for conducting processing in accordance with an abstracted action command.

14. A game apparatus according to claim 11, wherein the scenario macro is binary data in which procedures for processing the scenario are listed.

15. A game system according to claim 11, wherein the distribution means distributes a new scenario macro every given period of time.

16. A game system according to claim 11, wherein the distribution means supplies the scenario macro to a communication network or a recording medium.

17. A game apparatus according to claim 11, wherein the scenario macro is macro data for controlling the progress of the scenario of a puzzle game application.

18. A game apparatus according to claim 17, wherein the puzzle game is a game which requires a player to operate an object moving in images on a monitor screen in accordance with a question.

19. A game apparatus according to claim 18, wherein the scenario macro is composed of information about an initial position of the object, information to display the object next time, information to clear the game, and information about a character to appear in the game.

20. A game apparatus according to claim 19, wherein the second means comprises means for automatically preparing a text of the question by using the clear conditions and the character conditions.

21. A game apparatus according to claim 19, wherein the second means comprises inflection means for changing the ending of the question text according to the type of the character.

22. A game apparatus according to any one of claims 19 through 21, wherein the object is displayed as a jewel caused to fall down from the top of an image on the monitor screen.

23. A recording medium with a program stored thereon for causing a computer to function as the game apparatus in any one of claims 1 through 9 or 11 through 21.

24. A recording medium with a program stored thereon for causing a computer to function as the game apparatus in claim 10.

25. A recording medium with a program stored thereon for causing a computer to program as the processing means in claim 22.

26. A game apparatus comprising:

a processor;

a communications device for externally incorporating at least one scenario macro; and a programmed memory, comprising a) a macro group comprising a sequence of one or more scenario macros that command at least one processing procedure of the scenario, b) a data group, comprising video data, graphics, text and other information used in accordance with the progress of the game scenario, and c) a program that responds to commands from the macro group, and that directs the processor to use the data group.

* * * * *